(12) United States Patent
Ohtake et al.

(10) Patent No.: US 8,364,017 B2
(45) Date of Patent: Jan. 29, 2013

(54) IMAGE PROCESSING APPARATUS, IMAGE PROCESSING METHOD, IMAGE PLAYBACK APPARATUS, IMAGE PLAYBACK METHOD, AND PROGRAM

(75) Inventors: Michiko Ohtake, Aichi (JP); Kenji Hashimoto, Aichi (JP); Ayumi Kondo, Aichi (JP)

(73) Assignee: Sony Corporation (JP)

( * ) Notice: Subject to any disclaimer, the term of this patent is extended or adjusted under 35 U.S.C. 154(b) by 858 days.

(21) Appl. No.: 12/454,130

(22) Filed: May 13, 2009

(65) Prior Publication Data

US 2009/0290849 A1 Nov. 26, 2009

(30) Foreign Application Priority Data

May 16, 2008 (JP) ............................... P2008-129889

(51) Int. Cl.
H04N 9/80 (2006.01)
(52) U.S. Cl. ........................................ 386/248; 386/247
(58) Field of Classification Search .................. 348/448; 386/241; 725/448
See application file for complete search history.

(56) References Cited

U.S. PATENT DOCUMENTS

| 7,145,601 | B2 | 12/2006 | Misawa et al. | |
|---|---|---|---|---|
| 7,283,174 | B2 * | 10/2007 | Tokuhara et al. | ............. 348/448 |
| 2004/0047592 | A1 | 3/2004 | Seo et al. | |
| 2005/0180728 | A1 | 8/2005 | Ichioka et al. | |
| 2006/0182436 | A1 | 8/2006 | Tabuchi et al. | |
| 2007/0147793 | A1 | 6/2007 | Tabuchi et al. | |

FOREIGN PATENT DOCUMENTS

| EP | 1557746 A2 | 7/2005 |
|---|---|---|
| EP | 1821306 A2 | 8/2007 |
| JP | 2001-197414 | 7/2001 |
| JP | 2003-018568 A | 1/2003 |
| JP | 2003-045162 A | 2/2003 |
| JP | 2005-012399 A | 1/2005 |
| JP | 2005-352684 A | 12/2005 |
| JP | 2006-222771 | 8/2006 |
| JP | 2007-059961 A | 3/2007 |

OTHER PUBLICATIONS

European Search Report, EP 09160342, dated Mar. 25, 2010.
Rockbox User Manual (Version 2.3)' Internet Citation Dec. 12, 2004, p. 98FF, XROO91 30466 Retrieved from the Internet: <URL:http://www.rockbox.org/wiki/pub/>Main/DocBoxObsolete/rockbox-manual-2.3-draft-3.pdf [retrieved on Mar. 4, 2010].
"Gwenview 1.4.0 Download page" Internet Citation Sep. 17, 2006, XPOO9130537 Retrieved from the Internet: URL:http://sourceforge.net/projects/gwenview/files/gwenview/1.4.0/ [retrieved on Mar. 5, 2010].
Summons to attend oral proceedings pursuant to Rule 115(1) EPC, Application No. 09160342.3, dated Feb. 13, 2012.

* cited by examiner

*Primary Examiner* — Jamie Atala
(74) *Attorney, Agent, or Firm* — Lerner, David, Littenberg, Krumholz & Mentlik, LLP

(57) ABSTRACT

An image processing apparatus controls display of a plurality of pieces of image data containing both moving image data and still image data, and includes: a moving image/still image determining unit that determines whether or not image data to be displayed is the moving image data or the still image data, when in a continuous display mode that displays the plurality of pieces of image data continuously in a predetermined sequence; and a display control unit that starts display control of the next image in response to finishing of display of all of the moving image data when the image data to be displayed is the moving image data, and starts display control of the next image data in response to finishing of display of the still image data for a predetermined time when the image data to be displayed is the still image data.

16 Claims, 19 Drawing Sheets

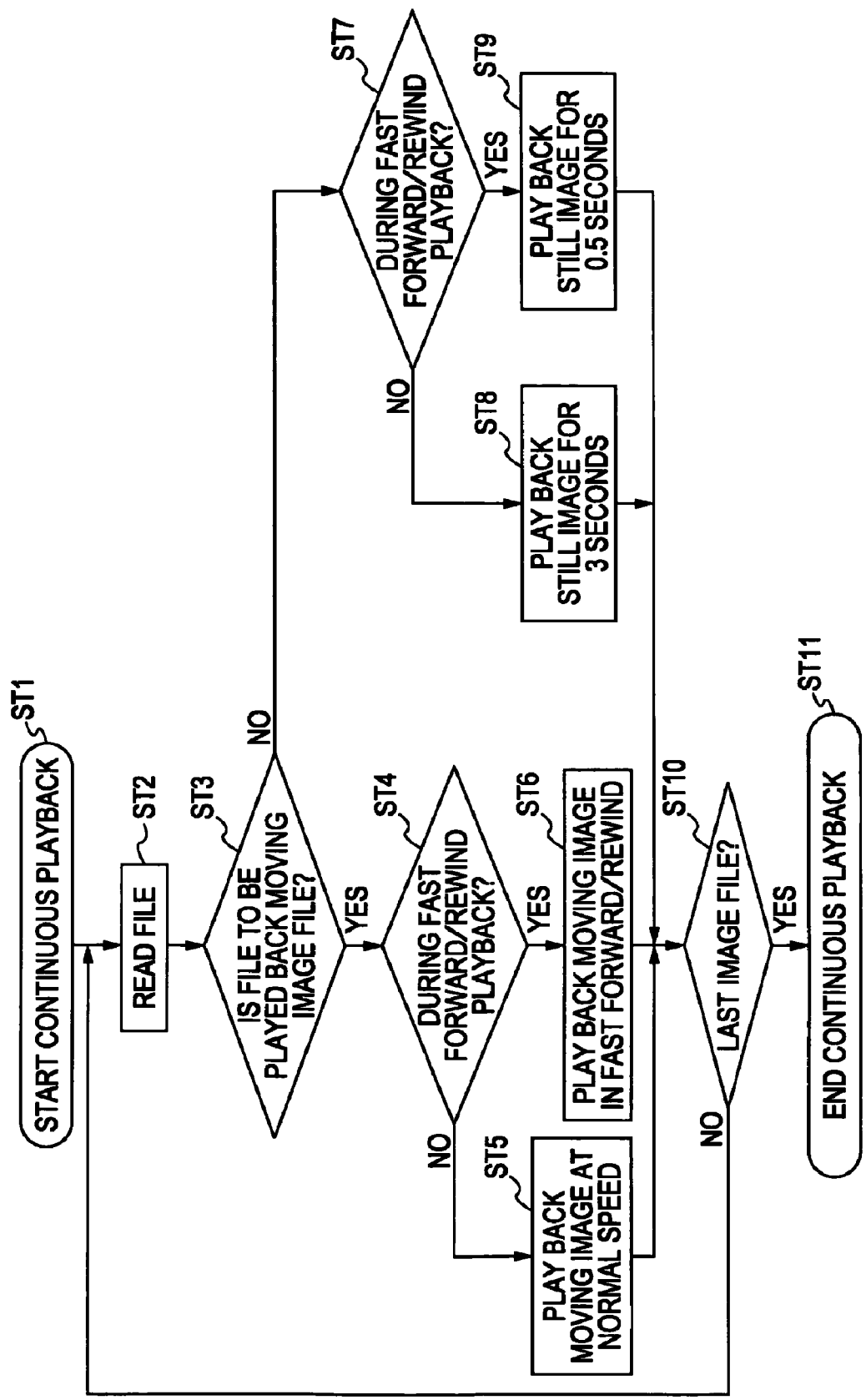

IMAGE PROCESSING APPARATUS, IMAGE PROCESSING METHOD, IMAGE PLAYBACK APPARATUS, IMAGE PLAYBACK METHOD, AND PROGRAM

The present application claims priority from Japanese Patent Application No. JP 2008-129889 filed in the Japanese Patent Office on May 16, 2008, the entire content of which is incorporated herein by reference.

BACKGROUND OF THE INVENTION

1. Field of the Invention

The present invention relates to an image processing apparatus, an image processing method, an image playback apparatus, an image playback method, and a program.

2. Description of the Related Art

In recent years, there are digital still cameras that enable recording and playback of moving images, in addition to recording and playback of still images. In this type of digital still cameras, both still image files and moving image files are recorded on a recording medium such as a memory card, and these individual files are handled as fragments, making it difficult for the user to grasp a continuous captured image at preview. For example, Japanese Unexamined Patent Application Publication No. 2001-197414 (and the corresponding U.S. Pat. No. 7,145,601) describes a digital still camera that makes it possible to select a still image file or a moving image file and play back the selected file alone.

In digital still cameras that enable recording and playback of moving images, operations with respect to a moving image file are performed on a file-by-file basis. That is, for example, when a moving image file is played back, the playback stops upon reaching the end of the moving file, and in the case of a fast forward/rewind operation as well, the operation stops upon reaching the end or beginning of the moving image file. Thus, moving image recordings are repeated frequently, and even when a plurality of continuous moving image files are present on a recording medium, the individual moving image files can be played back only as fragments at preview, making it difficult for the user to grasp a continuous captured image.

SUMMARY OF THE INVENTION

As described above, digital still cameras according to the related art have a problem in that image files (still image files and moving image files) recorded on a recording medium can be played back only as fragments, making it difficult to grasp a continuous captured image at preview.

It is desirable to make it easier for the user to grasp a continuous recorded image.

According to an embodiment of the present invention, there is provided an image processing apparatus which controls display of a plurality of pieces of image data containing both moving image data and still image data, including: a moving image/still image determining unit that determines whether or not image data to be displayed is the moving image data or the still image data, when in a continuous display mode that displays the plurality of pieces of image data continuously in a predetermined sequence; and a display control unit that starts display control of the next image in response to finishing of display of all of the moving image data when the image data to be displayed is the moving image data, and starts display control of the next image data in response to finishing of display of the still image data for a predetermined time when the image data to be displayed is the still image data.

In the above-mentioned embodiment, the image processing apparatus may further include: a graphic display unit that displays a graphical user interface screen on the display panel so as to be superimposed on an image based on the image data to be displayed; and a user setting unit that allows a user to set whether or not to display a start button and a stop button for the continuous display mode on the display panel so as to be superimposed on the image.

In the above-mentioned embodiment, when in the continuous display mode and in a variable-speed display mode, the display control unit may change a display time of the moving image data and a display time of the still image data relative to a display time in a normal-speed display mode.

In the above-mentioned embodiment, the image processing apparatus may further include: a display panel that displays an image based on the image data to be displayed; and a graphic display unit that displays a graphical user interface screen on the display panel so as to be superimposed on the image, and when, in the continuous display mode, an image based on the moving image data is displayed on the display panel, the graphic display unit may display on the display panel a graphical user interface screen including a display time and a display elapsed time of the moving image data.

In the above-mentioned embodiment, the display control unit may start display control of the next image data when data advance is instructed, and start display control of the previous image data when data return is instructed.

In the above-mentioned embodiment, when, in the continuous playback mode, the data return is instructed in a state in which display control of the moving image data is performed by the display control unit, the display control unit may return to the beginning of the moving image data and start display control, when a display elapsed time of the moving image data is equal to or more than a predetermined time, and the display control unit may return to image data preceding the moving image data and start display control, when the display elapsed time of the moving image data is less than the predetermined time.

In the above-mentioned embodiment, the image processing apparatus may further include: a display panel that displays an image based on the image data to be displayed; and a graphic display unit that displays a graphical user interface screen on the display panel so as to be superimposed on the image, and when in the continuous display mode, the graphic display unit may display, on the display panel, the graphical user interface screen including display of a display time and a display elapsed time of all of image data to be continuously displayed.

According to an embodiment of the present invention, there is provided an image processing method for controlling display of a plurality of pieces of image data containing both moving image data and still image data, including the steps of: determining whether or not image data to be displayed is the moving image data or the still image data, when in a continuous display mode that displays the plurality of pieces of image data continuously in a predetermined sequence; starting display control of the next image in response to finishing of display of all of the moving image data, when the image data to be displayed is the moving image data; and starting display control of the next image data in response to finishing of display of the still image data for a predetermined time, when the image data to be displayed is the still image data.

According to an embodiment of the present invention, there is provided a program for causing a computer to execute an image processing method for controlling display of a plurality of pieces of image data containing both moving image data and still image data, the image processing method including the steps of: determining whether or not image data to be displayed is the moving image data or the still image data, when in a continuous display mode that displays the plurality of pieces of image data continuously in a predetermined sequence; starting display control of the next image in response to finishing of display of all of the moving image data, when the image data to be displayed is the moving image data; and starting display control of the next image data in response to finishing of display of the still image data for a predetermined time, when the image data to be displayed is the still image data.

According to an embodiment of the present invention, there is provided an image playback apparatus including: an image data reading unit that reads image data recorded on a recording medium; and an image data output unit that outputs playback image data on the basis of the image data read by the image data reading unit, in which when in a continuous playback mode, the image data reading unit continuously reads image data to be continuously played back which is recorded on the recording medium, and when in the continuous playback mode, when the image data read by the image data recording unit is moving image data, the image data output unit outputs the moving image data as the playback image data, and when the image data read by the image data recording unit is still image data, the image data output unit outputs the still image data for a predetermined time as the playback image data.

In the above-mentioned embodiment, when in the continuous playback mode and in a variable-speed playback mode, the image data output unit may change an output time of the playback image data corresponding to the image data sequentially read by the image data reading unit, relative to an output time in a normal-speed playback mode.

In the above-mentioned embodiment, when, in the continuous playback mode and in the variable-speed playback mode, the output time of the playback image data corresponding to the image data read by the image data reading unit is to be changed relative to the output time in the normal-speed playback mode, when the image data read by the image data reading unit is moving image data, the image data output unit may change playback speed of the moving image data, and when the image data read by the image data reading unit is still image data, the image data output unit may change an output time of the still image data outputted as the playback image data.

In the above-mentioned embodiment, the image playback apparatus may further include a graphic display unit that displays, on a display panel that displays a playback image, a graphical user interface screen so as to be superimposed on the playback image, on the basis of the playback image data outputted from the image data output unit, and when, in the continuous playback mode, the image data output unit is outputting the moving image data as the playback image data, the graphic display unit may display, on the display panel, the graphical user interface screen including display of a playback time and a playback elapsed time of the moving image data.

In the above-mentioned embodiment, when in the continuous playback mode, when data advance is instructed, the image data output unit may enter a state in which the image data output unit outputs the playback image data corresponding to the next image data, and when data return is instructed, the image data output unit may enter a state in which the image data output unit outputs the playback image data corresponding to the previous image data.

In the above-mentioned embodiment, when, in the continuous playback mode, the data return is instructed in a state in which the moving image data is outputted from the image data output unit as the playback image data, the image data output unit may return to the beginning of the moving image data and start an output of the playback image data, when a playback elapsed time of the moving image data is equal to or more than a predetermined time, and the image data output unit may return to image data preceding the moving image data and start an output of the playback image data, when the playback elapsed time of the moving image data is less than the predetermined time.

In the above-mentioned embodiment, the image playback apparatus may further include a graphic display unit that displays, on a display panel that displays a playback image, a graphical user interface screen so as to be superimposed on the playback image, on the basis of the playback image data outputted from the image data output unit, and when in the continuous playback mode, the graphic display unit may display, on the display panel, the graphical user interface screen including display of a playback time and a playback elapsed time of all of image data to be continuously played back which is recorded on the recording medium.

According to an embodiment of the present invention, there is provided an image playback method including the steps of: continuously reading image data to be continuously played back which is recorded on a recording medium; outputting moving image data as playback image data, when the read image data is the moving image data; and outputting still image data as the playback image data for a predetermined time, when the read image data is the still image data.

According to an embodiment of the present invention, there is provided a program for causing a computer to execute an image playback method, the image playback method including the steps of: continuously reading image data to be continuously played back which is recorded on a recording medium; outputting moving image data as playback image data, when the read image data is the moving image data; and outputting still image data as the playback image data for a predetermined time, when the read image data is the still image data.

BRIEF DESCRIPTION OF THE DRAWINGS

FIG. 9 is a flowchart showing the procedure of the control process of a control unit when in the continuous playback mode;

DESCRIPTION OF THE PREFERRED EMBODIMENTS

Figure 1:
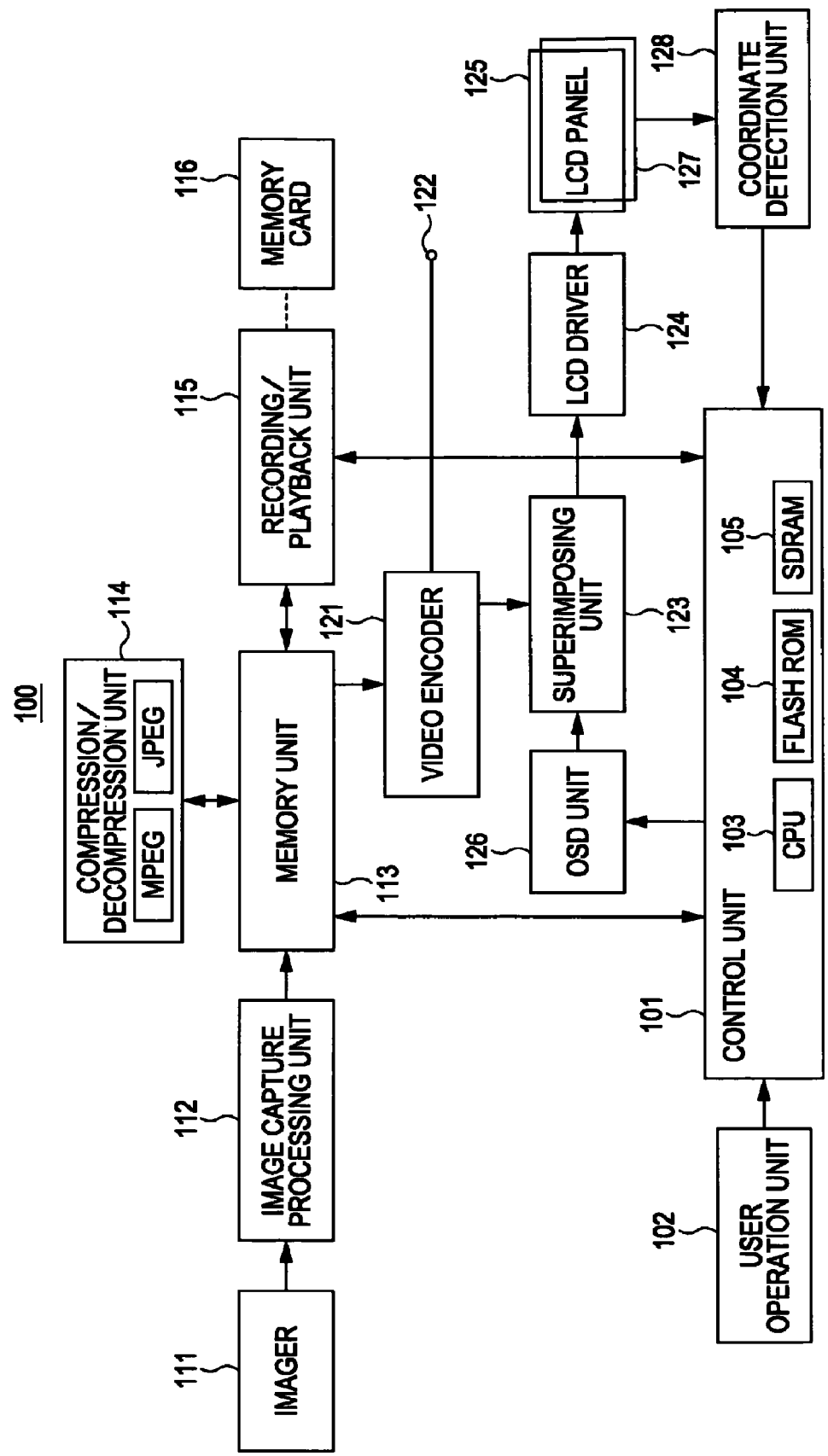
FIG. 1 is a block diagram showing a configuration example of a digital still camera according to an embodiment of the present invention.

Hereinbelow, embodiments of the present invention will be described with reference to the drawings. FIG. 1 shows a configuration example of a digital still camera 100 according to an embodiment of the present invention. The digital still camera 100 allows recording and playback of moving images, in addition to recording and playback of still images.

The digital still camera 100 has a control unit 101, and a user operation unit 102. Also, the digital still camera 100 has an imager 111, an image capture processing unit 112, a memory unit 113, a compression/decompression unit 114, and a recording/playback unit 115.

Also, the digital still camera 100 has a video encoder 121, a video output terminal 122, a superimposing unit 123, an LCD driver 124, an LCD panel 125, an OSD (On-Screen Display) unit 126, a touch panel 127, and a coordinate detection unit 128.

The control unit 101 controls individual units of the digital still camera 100. In FIG. 1, some of control lines from the control unit 101 to individual units are omitted for the simplicity of drawing. The control unit 101 includes a flash ROM 104 and an SDRAM 105.

The flash ROM 104 stores a control program for the CPU 103, and the like. The SDRAM 105 is used for temporary storage or the like of data necessary for the control process of the CPU 103. The CPU 103 expands the program and data read from the flash ROM 104 on the SDRAM 105 to activate the program, thereby controlling the individual units of the digital still camera 100.

The user operation unit 102 forms a user interface and is connected to the control unit 101. The user operation unit 102 is formed by keys, buttons, or dials arranged on the casing surface (not shown) of the digital still camera 100, or further by a remote control transceiver or the like. By using the user operation unit 102, the user can operate recording to and playback from the digital still camera 100, and also can makes various settings.

The imager (image capture unit) 111 is formed by, for example, a C-MOS (Complementary Metal Oxide Semiconductor) image capture device or a CCD (Charge Coupled Device) image capture device. The image capture processing unit 112 processes an image capture signal obtained by the imager 111 to generate image data (captured image data) corresponding to the captured image of a subject. The image capture processing unit 112 performs processes such as sample-and-hold and gain control, analog signal-digital signal conversion, and further, white balance adjustment, and gamma correction, with respect to the image capture signal (analog signal) outputted from the imager 111.

The memory unit 113 is formed by, for example, a semiconductor memory such as an SDRAM. The memory unit 113 functions as a buffer for temporarily storing image data at recording and at playback. That is, at recording, the memory unit 113 temporarily stores captured image data generated by the image capture processing unit 112, and also temporarily stores compression-encoded data generated in the compression/decompression unit 114 from this captured image data. Also, at playback, the memory unit 112 temporarily stores compression-encoded data contained in an image file read in the recording/playback unit 115, and also temporarily stores playback image data generated in the compression/decompression unit 114 from this compression-encoded data.

At the recording of a still image file, the compression/decompression unit 114 applies compression encoding in the JPEG (Joint Photographic Experts Group) scheme to still image data obtained in the image capture processing unit 112, thereby generating compression-encoded data (JPEG signal) of still images as recorded image data. Also, at the recording of a moving image file, the compression/decompression unit applies compression encoding in the MPEG (Moving Picture Experts Group) scheme to moving image data obtained in the image capture processing unit 112, thereby generating compression-encoded data (MPEG signal) of moving images as recorded image data.

At the playback of a still image file, the compression/decompression unit 114 applies a decoding process to compression-encoded data (JPEG signal) of still images obtained in the recording/playback unit 115, thereby generating playback image data of still images. Also, at the playback of a moving image file, the compression/decompression unit 114 applies a decoding process to compression-encoded data (MPEG signal) of moving images obtained in the recording/playback unit 115, thereby generating playback image data of moving images.

At the recording of a still image file, the recording/playback unit 115 generates a still image file containing the compression-encoded data (JPEG signal) of still images generated in the compression/decompression unit 114, and writes this still image file to a memory card 116. Also, at the recording of a moving image file, the recording/playback unit 115 generates a moving image file containing the compression-encoded data (MPEG signal) of moving images generated in the compression/decompression unit 114, and writes this moving image file to the memory card 116.

At the playback of a still image file, the recording/playback unit 115 reads the still image file from the memory card 116, and obtains compression-encoded data (JPEG signal) of still images contained in this still image file. Also, at the playback of a moving image file, the recording/playback unit 115 reads the moving image file from the memory card 116, and obtains compression-encoded data (MPEG signal) of moving images contained in this moving image file.

The recording/playback unit 115 forms a file writing unit (image data writing unit) and a file reading unit (image data reading unit). Also, the memory unit 113 and the compression/decompression unit 114 form an image data generating unit and an image data output unit.

The video encoder 121 generates a high-definition output signal on the basis of captured image data at the time of recording, and on the basis of playback image data at the time of playback, and supplies the high-definition output signal to the video signal output terminal 122. Also, the video encoder 121 generates a panel output signal on the basis of captured image data at the time of recording, and on the basis of playback image data at the time of playback, and supplies the panel output signal to the superimposing unit 123. It is also possible to generate only one of a high-definition output signal and a panel output signal for transmission to external equipment.

The superimposing unit 123 superimposes a GUI-screen display signal from an OSD unit 126, on the panel output signal (captured image signal or playback image signal) generated by the video encoder 121, and supplies the resulting signal to the LCD driver 124. The LCD driver 124 drives the LCD panel 125 on the basis of image data supplied from the superimposing unit 123, and displays a captured image or playback image on the LCD panel 125. As described above, by superimposing a GUI-screen display signal on the panel output signal in the superimposing unit 123, the captured image or playback image displayed on the LCD panel 125 has a GUI screen superimposed thereon. The OSD unit 126 forms a graphic display unit.

The touch panel 127 forms a position specifying unit for specifying a position on the screen of the LCD panel 125, and is arranged on the screen of the LCD panel 125. The user can manipulate an image capture operation, a recording operation, and the like at image capture, and a playback operation and the like at playback. The touch panel 127 is connected to the control unit 10 via the coordinate detection unit 128. The user can specify a position on the screen of the LCD panel 125 by touching the touch panel 127 directly with a finger or with a pen.

The operation of the digital still camera 100 shown in FIG. 1 will be described.

First, operations at image capture and at recording will be described. An image capture signal obtained by the imager 111 is supplied to the image capture processing unit 112 for processing, and captured image data corresponding to the captured image of a subject is obtained from the image capture processing unit 112. This captured image data is supplied to the memory unit 113 for temporary storage. In the video encoder 121, a high-definition output signal is generated on the basis of the captured image data stored in the memory unit 113, and is supplied to the video signal output terminal 122.

In the video encoder 121, a panel output signal is generated on the basis of the captured image data stored in the memory unit 113. This panel output signal is supplied to the LCD driver 124 through the superimposing unit 123. Thus, a captured image is displayed on the LCD panel 125 so that the user can check the captured image.

When the user operates a shutter button of the user operation unit 102, captured image data corresponding to the operation timing of the shutter button is extracted from captured image data stored in the memory unit 113. In the compression/decompression unit 114, a data compression process is applied in the JPEG scheme to this still image data, and compression-encoded data (JPEG signal) of still images is generated.

This compression-encoded data of still images is temporarily stored into the memory unit 113 before being supplied to the recording/playback unit 115 at appropriate timing. In the recording/playback unit 115, a still image file containing the compression-encoded data (JPEG signal) of still images is generated, and this still image file is written to the memory card 116.

On the other hand, when the user operates a record button of the user operation unit 102, and then operates a stop button, captured image data corresponding to the timing from when the record button is operated to when the stop button is operated is extracted from captured image data stored in the memory unit 113. In the compression/decompression unit 114, a data compression process is applied in the MPEG scheme to this moving image data, and compression-encoded data (MPEG signal) of moving images is generated.

This compression-encoded data of moving images is temporarily stored into the memory unit 113 before being supplied to the recording/playback unit 115 at appropriate timing. In the recording/playback unit 115, a moving image file containing the compression-encoded data (MPEG signal) of moving images is generated, and this moving image file is written to the memory card 116.

The still image file and the moving image file to be recorded on the memory card 116 are managed on the basis of, for example, a DCF (Design rule for Camera File system) that specifies the directory structure and the handling of files or the like.

Figure 2:
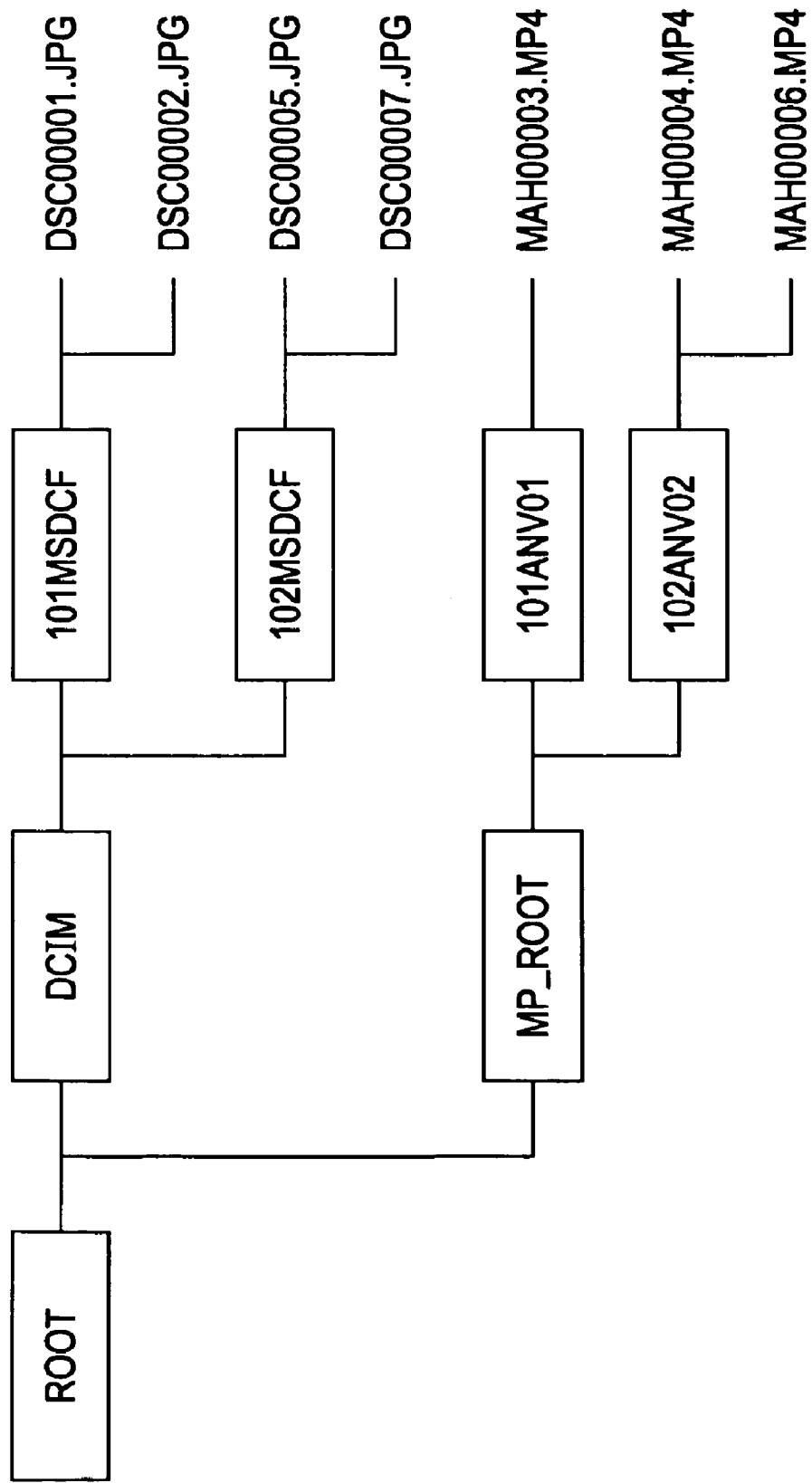
FIG. 2 is a diagram illustrating a folder structure of a memory card.

FIG. 2 shows an example of the folder structure of the memory card 116. A "DCIM directory" is created directly under a "ROOT directory". Then, directories referred to as "DCF directories", which follow a naming rule of "a three-digit directory number followed by five free characters", are created as sub-directories of this "DCIM directory", and still image files (extension files are "JPEG") are stored in the directories.

In the folder structure shown in FIG. 2, "DCF directories" named "101MSDCF" and "102MSDCF" are created as sub-directories of the "DCIM directory". Then, still image files "DSC00001. JPG" and "DSC00002. JPG" are stored in the directory "101MSDCF". Also, still image files "DSC00005. JPG" and "DSC00007. JPG" are stored in the directory "102MSDCF".

An "MP_ROOT directory" is created directly under the "ROOT directory". Then, directories referred to as "DCF directories", which follow a naming rule of "a three-digit directory number followed by five free characters", are created as sub-directories of this "MP_ROOT directory", and moving image files (extension files are "MP4") are stored in the directories.

In the folder structure shown in FIG. 2, "DCF directories" named "101ANV01" and "102ANV02" are created as subdirectories of the "MP_ROOT directory". Then, a moving image file "MAH00003. MP4" is stored in the directory "101 ANV01". Also, still image files "MAH00004. MP4" and "MAH00006. MP4" are stored in the directory "102ANV02".

The last five digits of the file names of still image files and moving image files are serially numbered in order of image capture. As will be described later, in this embodiment, the order of playback in a continuous playback mode is determined on the basis of these file names.

Next, operation at playback will be described. When the user operates, for example, a playback button of the user operation unit 102, the digital still camera 100 is put to a playback mode. In this embodiment, the playback mode includes a single playback (display) mode and a continuous playback (display) mode. A single playback mode refers to a mode in which only an image file (image data) selected by the user by operating the file advance button or the file return button is played back. In the single playback mode, first, the last captured image file recorded on the memory card 116 is played back.

In the recording/playback unit 115, an image file is read from the memory card 116. Compression-encoded data contained in this image file is supplied to the memory unit 113 for temporary storage. This compression-encoded data is decoded in the compression/decompression unit 114, and playback image data is obtained. This playback image data is supplied to the memory unit 113 for temporary storage.

At this time, if the playback image file is a still image file, the compression-encoded data supplied from the recording/playback unit 115 to the memory unit 113 is a JPEG signal, and the playback image data decoded in the compression/decompression unit 114 and supplied to the memory unit 113 is still image data. Also, if the playback image file is a moving image file, the compression-encoded data supplied from the recording/playback unit 115 to the memory unit 113 is an MPEG signal, and the playback image data decoded in the compression/decompression unit 114 and supplied to the memory unit 113 is moving image data.

In this way, on the basis of the playback image data temporarily stored into the memory unit 113, a high-definition output signal is generated in the video encoder 121. This high-definition output signal is outputted to the video signal output terminal 122. Also, on the basis of the playback image data temporarily stored into the memory unit 113, a panel output signal is generated in the video encoder 121. This panel output signal is supplied to the LCD driver 124 through the superimposing unit 123. Thus, a playback image is displayed on the LCD 125, so the user can check the playback image through the display.

In this state, under control of the control unit 101, a GUI-screen display signal used for allowing the user to manipulate a playback operation or the like is generated in the OSD unit 126. This display signal is supplied to the superimposing unit 123, and superimposed onto the panel output signal supplied from the video encoder 121.

Thus, in the playback image displayed on the LCD panel 125, a GUI screen used for allowing the user to manipulate a playback operation or the like is displayed in a superimposed manner. Accordingly, the user can manipulate file advance (data advance) and file return (data return), and in the case of playback of a moving image file, fast forward and rewind, by using the touch panel 127 arranged on the LCD panel 125. The user can also perform similar manipulations by using keys or the like that form the user operation unit 102.

Figure 3A:
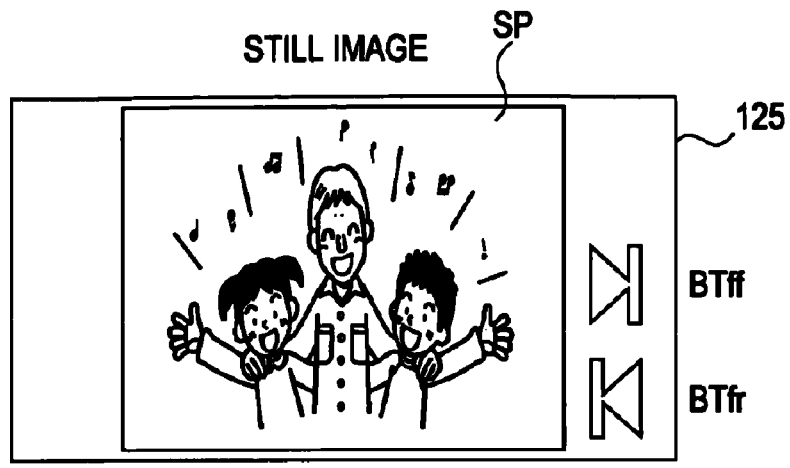
FIGS. 3A to 3C are views showing examples of display on an LCD panel at the playback of a still image file, at selecting a moving image file, and at the playback of a moving image file, respectively.

FIG. 3A shows an example of display on the LCD panel 125 at the playback of a still image file. In this case, a still image SP is displayed as a playback image. Also, in this case, a GUI screen including a file advance (data advance) button BTff and a file return (data return) button BTfr is displayed so as to be superimposed on this still image SP.

In the state shown in FIG. 3A, the user can perform a file advance operation of advancing the playback image file to the next image file, by pressing a position on the touch panel 127 corresponding to the file advance button BTff. Also, the user can perform a file return operation of returning the playback image file to the previous image file, by pressing a position on the touch panel 127 corresponding to the file return button BTfr.

Figure 3B:
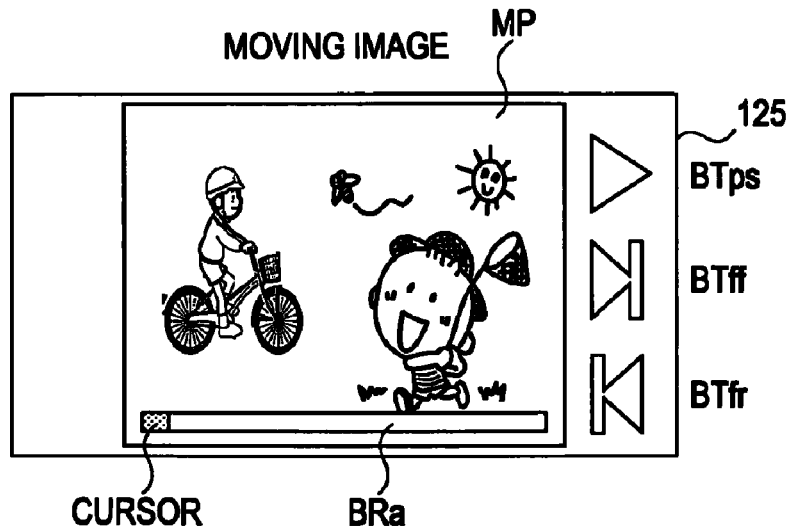

FIG. 3B shows an example of display on the LCD panel 125 at the time of selecting a moving image file. In this case, the first image of a moving image MP is displayed in a stationary state. Also, in this case, a GUI screen including a playback start button BTps, the file advance button BTff, and the file return button BTfr is displayed so as to be superimposed on this moving image MP (first image). Further, in this case, a progress bar BRa showing the playback time (display time) and playback elapsed time (display elapsed time) of moving image data is displayed so as to be superimposed on this moving image MP (first image).

In the state shown in FIG. 3B, the user can perform a file advance operation of advancing the playback image file to the next image file, by pressing a position on the touch panel 127 corresponding to the file advance button BTff. Also, the user can perform a file return operation of returning the playback image file to the previous image file, by pressing a position on the touch panel 127 corresponding to the file return button BTfr.

In the state shown in FIG. 3B, the user can perform an operation of starting playback of moving image data, by pressing a position on the touch panel 127 corresponding to the playback start button BTps. When playback of a moving image is started, the moving image MP that moves with the elapse of time as intended is displayed on the LCD panel 125. The cursor on the progress bar BRa moves with changes in playback elapsed time. The main part of the progress bar BRa indicates the playback time of moving image data, and the cursor position indicates the playback elapsed time.

Figure 3C:
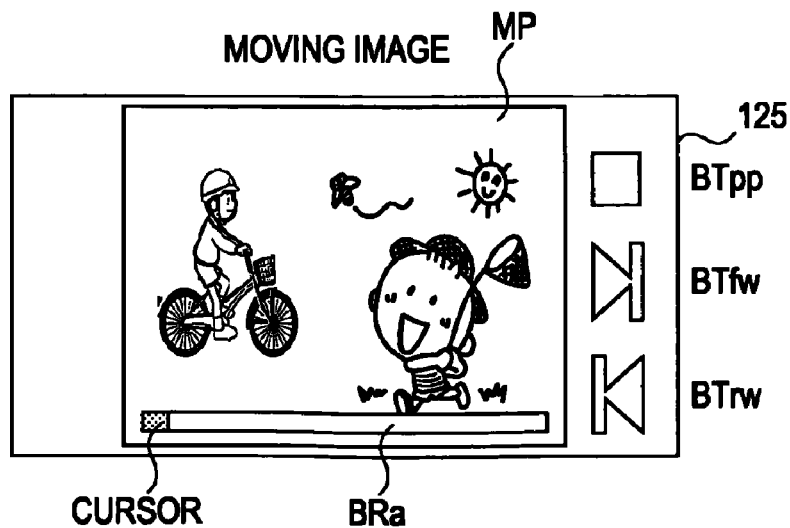

FIG. 3C shows an example of display on the LCD panel 125 at the playback of a moving image file. In this case, a playback stop button BTpp is displayed instead of the playback start button BTps in FIG. 3B, and also a fast forward button BTfw and a rewind button BTrw are displayed instead of the file advance button BTff and the file return button BTfr in FIG. 3B. In the state shown in FIG. 3C, the user can perform an operation of stopping playback of a moving image file (moving image data), by pressing a position on the touch panel 127 corresponding to the playback stop button BTpp.

At the playback of the moving image file described above, the user can perform an operation of entering a fast forward playback state by pressing a position on the touch panel 127 corresponding to the fast forward button BTfw. Also, at the playback of the moving image file described above, the user can perform an operation of entering a rewind playback state by pressing a position on the touch panel 127 corresponding to the rewind button BTrw.

Although not shown, in the fast forward playback state and the rewind playback state, the playback start button BTps is displayed instead of the playback stop button BTpp in FIG. 3C. Thus, the user can perform an operation of returning to the normal playback state by pressing a position on the touch panel 127 corresponding to the playback start button BTps.

Figure 4:
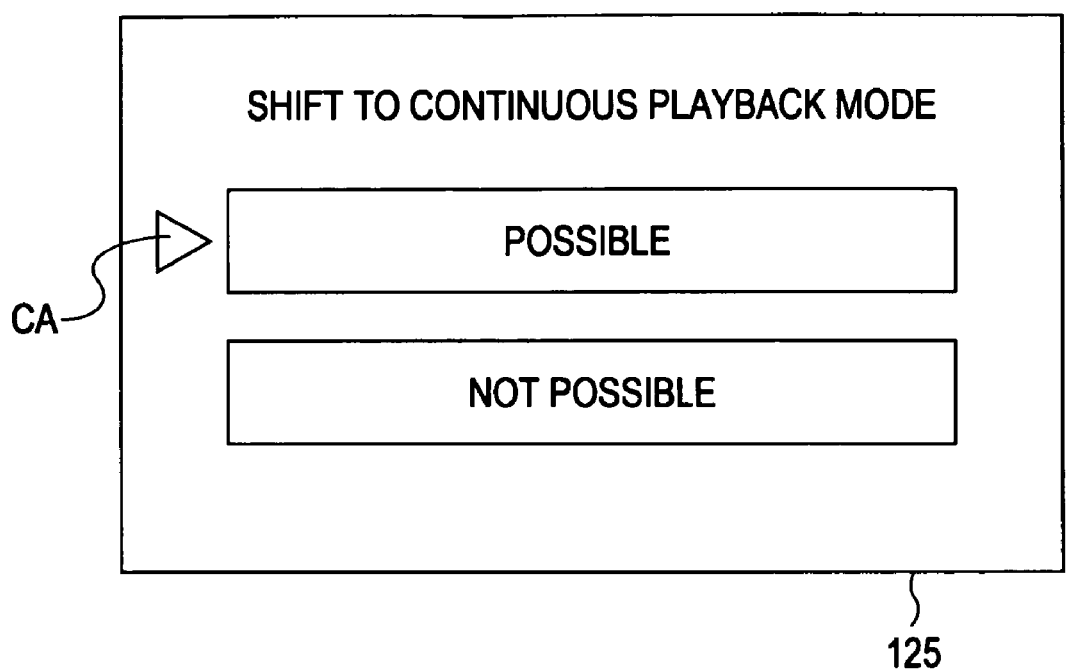
FIG. 4 is a view showing an example of a setting menu that is displayed on a LCD panel and used for setting whether or not it is possible to shift from a single playback mode to a continuous playback mode.

Next, the continuous playback mode (continuous display mode) will be described. In the digital still camera 100, whether or not it is possible to shift from the single playback mode to the continuous playback mode can be set in advance by using a setting menu. FIG. 4 shows an example of a setting menu displayed on the LCD panel 125 of the digital still camera 100.

The user can make a setting as to whether or not it is possible to shift from the single playback mode to the continuous playback mode, by pressing a location where "Possible" or "Not possible" is displayed on the touch panel 127. In the display example in FIG. 4, a cursor CA is at a position corresponding to the display position of "Possible", and thus it can be seen that such a shift is "Possible" under the current setting.

The user can also make this setting from the user operation unit 102 on the basis of a setting menu displayed on the LCD panel 125. A similar operation can be performed with the user operation unit 102 also with respect to other press operations on the touch panel 127 described later.

The example of display on the LCD panel 125 at playback in the single playback mode shown in FIGS. 3A and 3B described above shows an example of display in the case of a setting such that it is not possible to shift from the single playback mode to the continuous playback mode. In contrast, FIGS. 5A and 5B shows an example of display on the LCD panel 125 at playback in the single playback mode, in the case of a setting such that it is possible to shift from the single playback mode to the continuous playback mode.

Figure 5A:
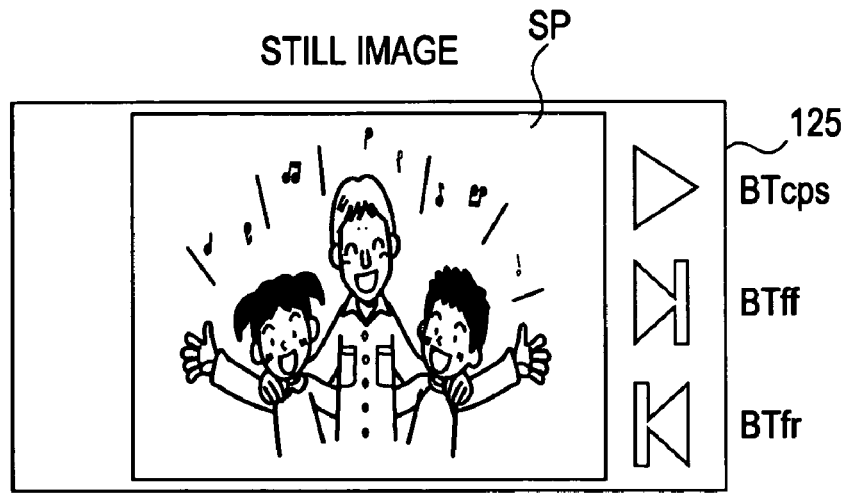
FIGS. 5A and 5B are views showing examples of display on an LCD panel at playback in a single playback mode, in the case of a setting in which it is possible to shift from a single playback mode to a continuous playback mode.

FIG. 5A shows an example of display at the playback of a still image file (still image data). In this case, the still image SP is displayed as a playback image. Also, in this case, a GUI screen further including a continuous playback start button (start button for the continuous playback mode) BTcps, in addition to the file advance button BTff and the file return button BTfr, is displayed so as to be superimposed on this still image SP. In this state, the user can perform a shift operation from the single playback mode to the continuous playback mode by pressing a position on the touch panel 127 corresponding to the continuous playback start button BTcps. In this regard, the LCD panel 125 and the touch panel 127 form the user operation unit.

Figure 5B:
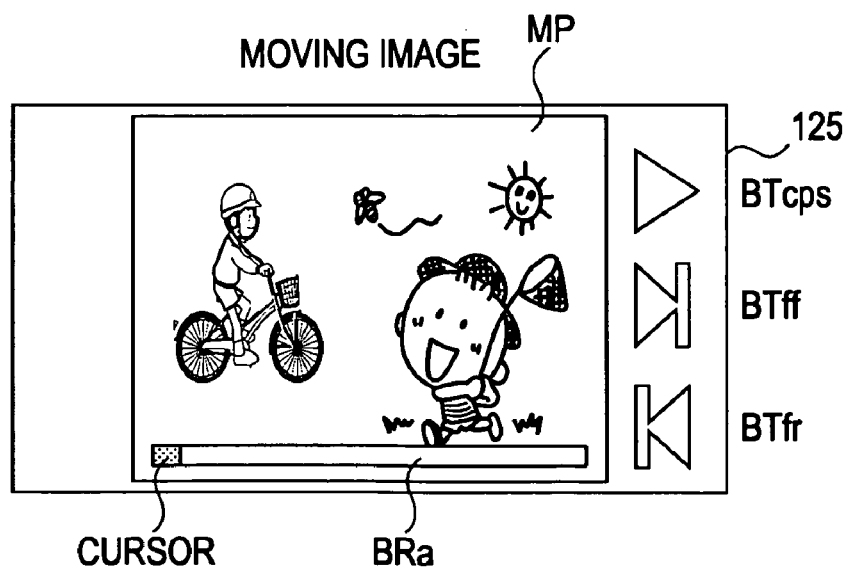

FIG. 5B is an example of display at the time of selecting a moving image file (moving image data). In this case, the first image of the moving image MP is displayed in a stationary state. Also, in this case, a GUI screen further including the continuous playback start button (start button for the continuous playback mode) BTcps, in addition to the file advance button BTff and the file return button BTfr, is displayed so as to be superimposed on this moving image MP. In this state, the user can perform a shift operation from the single playback mode to the continuous playback mode by pressing a position on the touch panel 127 corresponding to the continuous playback start button BTcps.

In the continuous playback mode, first, the current image file that has been played back in the single playback mode is played back, and thereafter, image files following the current image file are played back continuously. As described above, the last five digits of the file names of still image files and moving image files recorded on the memory card 116 are serially numbered in order of image capture. The playback order of image files in the continuous playback mode is set as, for example, the order of numbers indicated by the last five digits of their file names.

For example, when the folder structure on the memory card 116 is as shown in FIG. 2, and the current image file is "DSC00001. JPG" of "101MSCDF", image files are played back in the following sequence.

"DCS00001. JPG" of "101MSDCF"
"DCS00002. JPG" of "101MSDCF"
"MAH00003. MP4" of "101ANV01"
"MAH00004. MP4" of "102ANV02"
"DCS00005. JPG" of "102MSDCF"
"MAH00006. MP4" of "102ANV02"
"DCS00007. JPG" of "102MSDCF"

When in this continuous playback mode, image files are continuously read from the memory card 116 by the recording/playback unit 115. In the compression/decompression unit 114, a decoding process is applied to compression-encoded data contained in the image files sequentially read in the recording/playback unit 115. The playback image data of each image file generated in the compression/decompression unit 114 is supplied to the memory unit 113 for temporary storage.

If the image file is a still image file, as a high-definition output signal and a panel output signal, still image data is outputted from the video encoder 121 for a predetermined time, which is 3 seconds in this embodiment. Also, if the image file is a moving image file, as a high-definition output signal and a panel output signal, moving image data is outputted from the video encoder 121.

Figure 6A:
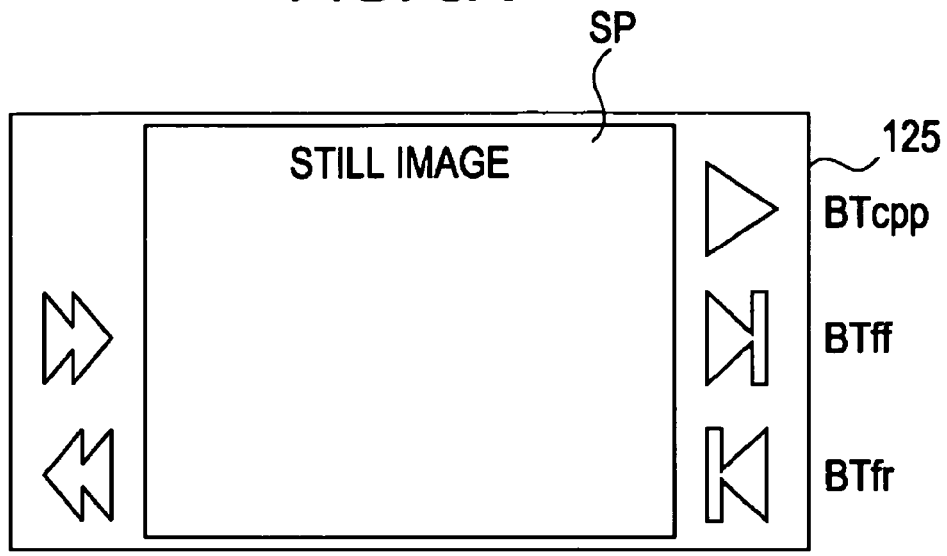
FIGS. 6A and 6B are views showing examples of display on an LCD panel when in the continuous playback mode and during normal-speed playback of a still image and a moving image, respectively.

FIG. 6A is an example of display on the LCD panel 125 when in the continuous playback mode and during normal-speed playback of a still image. In this case, the still image SP is displayed as a playback image. Also, in this case, a GUI screen including a continuous playback stop button (stop button for the continuous playback mode) BTcpp, the file advance button BTff, the file return button BTfr, the fast forward button BTfw, and the rewind button BTrw is displayed so as to be superimposed on this still image SP.

In the state shown in FIG. 6A, the user can perform a file advance operation of advancing the playback image file to the next image file, by pressing a position on the touch panel 127 corresponding to the file advance button BTff. Also, in the state shown in FIG. 6A, the user can perform a file return operation of returning the playback image file to the previous image file, by pressing a position on the touch panel 127 corresponding to the file return button BTfr.

At this time, when a file advance operation is made during playback of the last image file recorded on the memory card 116, the next image file becomes the first image file. Also, when a file return operation is made during playback of the first image file recorded on the memory card 116, the next image file becomes the last image file. In this regard, the last image file and the first image file mean the last and first image files according to the order of numbers indicated by the last five digits of their file names as described above, respectively.

In the state shown in FIG. 6A, the user can perform an operation of starting fast forward playback (fast forward mode) over a plurality of image files, by pressing a position on the touch panel 127 corresponding to the fast forward button BTfw. Also, in the state shown in FIG. 6A, the user can perform an operation of starting rewind playback (rewind mode) over a plurality of image files, by pressing a position on the touch panel 127 corresponding to the rewind button BTrw.

During this fast forward playback and rewind playback, the playback speed becomes faster than that during normal-speed playback. For example, with regard to the playback of a still image file, the output time of still image data (a high-definition output signal and a panel output signal) from the video encoder 121 is set shorter than 3 seconds, for example, 0.5 second. Also, for example, with regard to the playback of a moving image file, moving image data (a high-definition output signal and a panel output signal) from the video encoder 121 is outputted at predetermined-times speed, for example, at 6-times speed.

Also, in the state shown in FIG. 6A, the user can perform a shift operation from the continuous playback mode to the single playback mode by pressing a position on the touch panel 127 corresponding to the continuous playback stop button Btcpp.

Figure 6B:
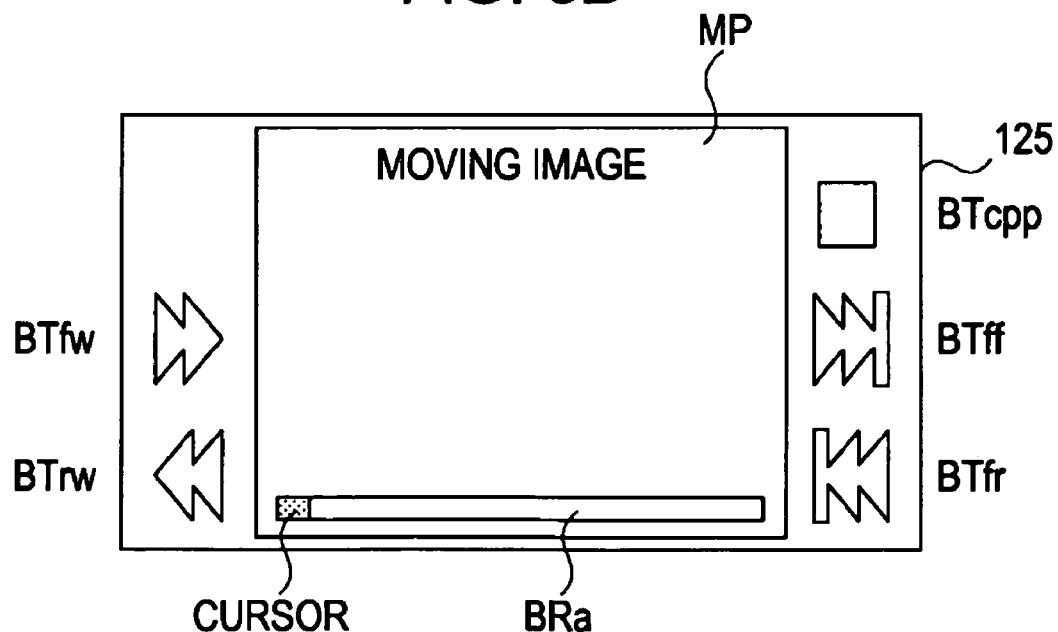

FIG. 6B is an example of display on the LCD panel 125 when in the continuous playback mode and during normal-speed playback of a moving image. In this case, the moving image MP is displayed as a playback image. Also, in this case, a GUI screen including the continuous playback stop button BTcpp, the file advance button BTff, the file return button BTfr, the fast forward button BTfw, the rewind button BTrw, and the progress bar BRa is displayed so as to be superimposed on this moving image MP.

In the state shown in FIG. 6B, the user can perform a file advance operation of advancing the playback image file to the next image file, by pressing a position on the touch panel 127 corresponding to the file advance button BTff. Also, in state shown in FIG. 6B, the user can perform a file return operation of returning the playback image file to the previous image file, by pressing a position on the touch panel 127 corresponding to the file return button BTfr.

At this time, when a file return operation is made by the user, in the digital still camera 100, the following operations are performed depending on whether or not the playback elapsed time of a moving image is equal to or more than a predetermined time, which in this embodiment is 0.5 second. That is, when the playback elapsed time of the moving image is equal to or more than 0.5 second, the operation returns not to the previous image file but to the beginning of the current moving image file. On the other hand, when the playback elapsed time of the moving image is less than 0.5 second, the operation returns to the previous image file.

In this way, the behavior at the time when a file return operation is made by the user is made to vary in accordance with whether or not the playback elapsed time of a moving image is equal to or more than 0.5 second, so that the user can make a conscious decision whether to return to the beginning of the moving image file by performing a file return operation only once, or to return to the previous image file by performing the file return operation twice successively.

In the state shown in FIG. 6B, the user can perform a fast forward playback operation by pressing a position on the touch panel 127 corresponding to the fast forward button BTfw. Also, in the state shown in FIG. 6B, the user can perform a rewind playback operation by pressing a position on the touch panel 127 corresponding to the rewind button BTrw.

Also, in the state shown in FIG. 6B, the user can perform a shift operation from the continuous playback mode to the single playback mode by pressing a position on the touch panel 127 corresponding to the continuous playback stop button Btcpp.

Figure 7A:
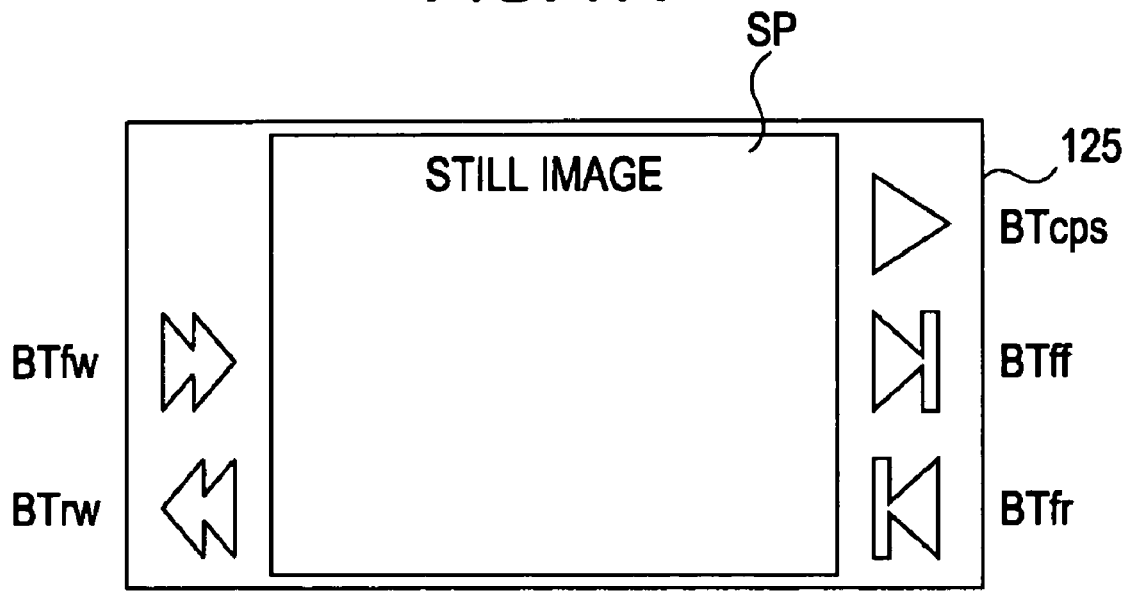
FIGS. 7A and 7B are views showing examples of display on an LCD panel when in the continuous playback mode and during fast forward playback or rewind playback.

FIG. 7A shows an example of display on the LCD panel 125 at the playback of a still image file, when in the continuous playback mode and during fast forward playback or rewind playback. In this case, the still image SP is displayed as a playback image. Also, in this case, a GUI screen including the continuous playback start button BTcps, the file advance button BTff, the file return button BTfr, the fast forward button BTfw, and the rewind button BTrw is displayed so as to be superimposed on this still image SP.

In the state shown in FIG. 7A, the user can perform an operation of stopping fast forward playback or rewind playback and returning to the state of normal-speed playback, by pressing a position on the touch panel 127 corresponding to the continuous playback start button Btcps.

Figure 7B:
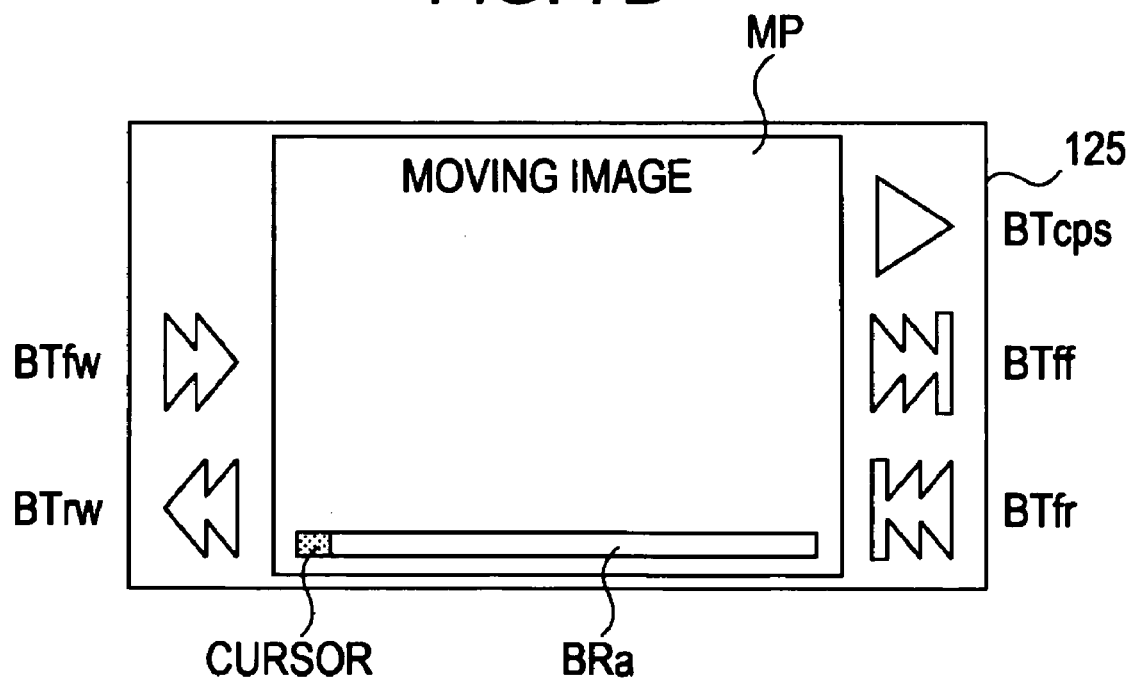

FIG. 7B shows an example of display on the LCD panel 125 at the playback of a moving image file, when in the continuous playback mode and during fast forward playback or rewind playback. In this case, the moving image MP is displayed as a playback image. Also, in this case, a GUI screen including the continuous playback start button BTcps, the file advance button BTff, the file return button BTfr, the fast forward button BTfw, the rewind button BTrw, and the progress bar BRa is displayed so as to be superimposed on this moving image MP.

In the state shown in FIG. 7B, the user can perform an operation of stopping fast forward playback or rewind playback and returning to the state of normal-speed playback, by pressing a position on the touch panel 127 corresponding to the continuous playback start button Btcps.

When in the continuous playback mode, upon finishing playback of the last image file (including finishing of playback by fast forward playback or rewind playback), the display on the LCD panel 125 becomes as follows.

Figure 8A:
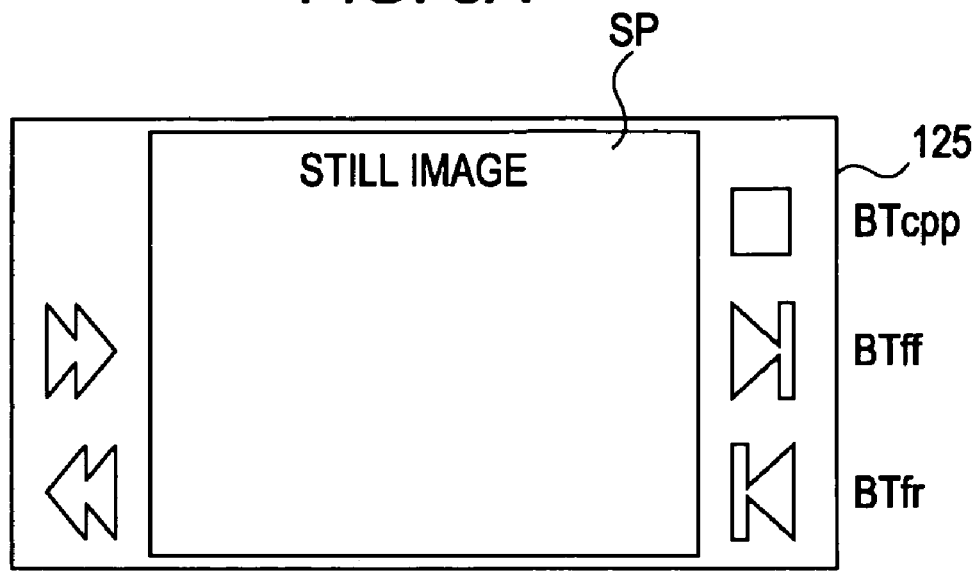
FIGS. 8A and 8B are views showing examples of display on an LCD panel when in the continuous playback mode and at the end of the control process of a control unit.

That is, when the last image file is a still image file, the display becomes as shown in FIG. 8A. In this case, the still image SP is displayed as a playback image. Also, in this case, a GUI screen including the continuous playback stop button BTcpp, the file advance button BTff, the file return button BTfr, the fast forward button BTfw, and the rewind button BTrw is displayed so as to be superimposed on this still image SP.

Figure 8B:
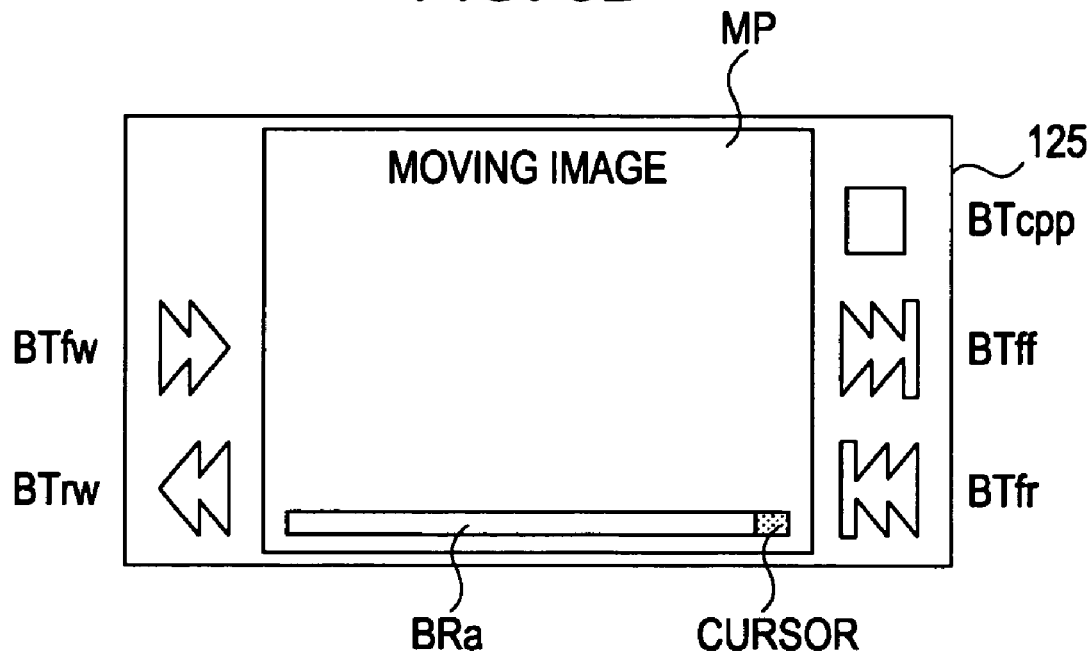

When the last image file is a moving image file, the display becomes as shown in FIG. 8B. In this case, the last image of the moving image MP (the first image of the moving image MP in the case of finishing of playback by rewind playback) is displayed as a playback image in a stationary state. Also, in this case, a GUI screen including the continuous playback stop button BTcpp, the file advance button BTff, the file return button BTfr, the fast forward button BTfw, the rewind button BTrw, and the progress bar BRa is displayed so as to be superimposed on this moving image MP.

In the state shown in FIGS. 8A and 8B, the user can perform a shift operation from the continuous playback mode to the single playback mode by pressing a position on the touch panel 127 corresponding to the continuous playback stop button Btcpp. Also, in the state shown in FIGS. 8A and 8B, the user can resume a continuous playback operation (including also fast forward playback and rewind playback) by pressing a position on the touch panel 127 corresponding to the file advance button BTff (the file return button BTfr in the case of finishing of playback by rewind playback).

FIG. 9 is a flowchart showing the procedure of a control process in the control unit 101 (CPU 103) when in the continuous playback mode.

In step ST1, the control unit 101 starts a continuous playback process, and thereafter shifts to the process in step ST2. In step ST2, the control unit 101 reads an image file to be played back. In this case, an image file to be read is read from the memory card 116 by the recording/playback unit 115, and compression-encoded data (JPEG signal or MPEG signal) contained in this image file is temporarily stored into the memory unit 113. Thereafter, the compression-encoded data is decoded by the compression/decompression unit 114 to generate playback image data (still image data or moving image data), and this playback image data is temporarily stored into the memory unit 113.

At this time, immediately after a shift from the single playback mode to the continuous playback mode, the first image file that is read is the same file as the image file to be played back in the single playback mode prior to the shift. In this case, since the image file to be played back has already been read, the reading of the image file can be omitted.

Also, in a case when continuous playback is resumed by a file advance or file return operation made by the user from a state in which continuous playback has been performed to the last image file and finished, the first image file that is read is the first image file or the last image file recorded on the memory card 116.

Next, in step ST3, the control unit 101 determines whether or not the image file to be played back is a moving image file. At this time, whether or not the image file to be played back is a moving image file can be determined by the name of the directory in which the image file is stored, or by the extension of the image file (see FIG. 2).

When the image file to be played back is a moving image file, the control unit 101 starts control of display of moving image data. That is, in step ST4, the control unit 101 determines whether or not the current state is fast forward playback or rewind playback. When the current state is neither fast forward playback nor rewind playback, the control unit 101 plays back the moving image at normal speed in step ST5. In this case, a high-definition output signal and a panel output signal corresponding to a moving image played back at normal speed are outputted from the video encoder 121.

On the other hand, when the current state is either fast forward playback or rewind playback, in step ST6, the control unit 101 performs fast forward playback or rewind playback of the moving image. In this case, a high-definition output signal and a panel output signal corresponding to a moving image played back in fast forward or rewind are outputted from the video encoder 121.

When the image file to be played back is a still image file, the control unit 101 starts display control of still image data. That is, in step ST7, the control unit 101 determines whether or not the current state is fast forward playback or rewind playback. When the current state is neither fast forward playback nor rewind playback, the control unit 101 plays back the still image for 3 seconds in step ST8. In this case, a high-definition output signal and a panel output signal corresponding to a still image are outputted from the video encoder 121 for 3 seconds.

On the other hand, when the current state is either fast forward playback or rewind playback, the control unit 101 plays back the still image for 0.5 second in step ST9. In this case, a high-definition output signal and a panel output signal corresponding to a still image are outputted from the video encoder 121 for 0.5 second.

After the process in step ST5, step ST6, step ST8, or step ST9 described above, the control unit 101 shifts to the process in step ST10. In step ST10, the control unit 101 determines whether or not the current image file to be played back is the last image file to be continuously played back.

In this regard, the last image file to be continuously played back is, in the case of normal-speed playback and fast forward playback, the last image file to be continuously played back which is recorded on the memory card 116, and in the case of rewind playback, the first image file to be continuously played back which is recorded on the memory card 116.

When the current image file to be played back is the last image file, the control unit 101 ends the continuous playback process in step ST11. On the other hand, when the current image file to be played back is not the last image file, the control unit 101 returns to step ST2, and shifts to a playback process of the next image file.

Since the control unit 101 (CPU 103) performs the processes that follow the flowchart in FIG. 9 described above, the control unit 101 forms a moving image/still image determining unit and a display control unit.

Next, a description will be given of a control process of the control unit 101 in a case when the user operates the fast forward button BTfw or the rewind button BTrw during normal-speed playback (during the moving image playback in step ST5 or during the still image playback in step ST8 in the flowchart in FIG. 9). In this case, the control unit 101 performs an interrupt process A shown in the flowchart in FIG. 10.

In step ST11, the control unit 101 starts the interrupt process A, and thereafter shifts to the process in step ST12. In step ST12, the control unit 101 determines whether or not the image file to be played back is a moving image file.

When the image file to be played back is a moving image file, the control unit 101 performs fast forward playback or rewind playback of the remaining moving image. In this case, a high-definition output signal and a panel output signal corresponding to a moving image played back in fast forward or rewind are outputted from the video encoder 121.

On the other hand, when the image file to be played back is a still image file, the control unit 101 plays back the still image for 0.5 second in step ST14. In this case, a high-definition output signal and a panel output signal corresponding to a still image are outputted from the video encoder 121 for 0.5 second.

After the process in step ST13, or after the process in step ST14, in step ST15, the control unit 101 proceeds to step ST10 in the flowchart in FIG. 9.

Figure 10:
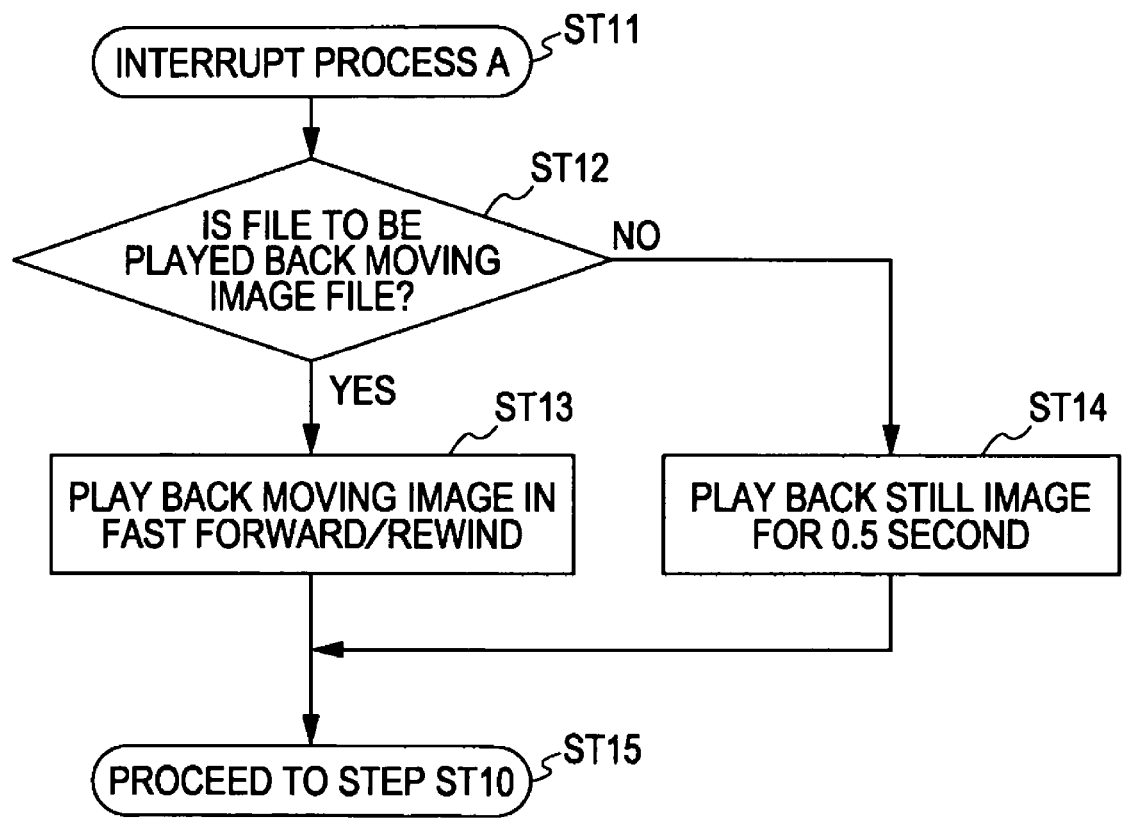
FIG. 10 is a flowchart showing an interrupt process A that is performed by a control unit when the user operates a fast forward button or a rewind button during normal-speed playback.

By performing the interrupt process A illustrated in the flowchart in FIG. 10 when the user operates the fast forward button BTfw or the rewind button BTrw during normal-speed playback, fast forward playback or rewind playback can be immediately performed from the current image file to be played back.

Next, a description will be given of a control process of the control unit 101 in a case when the user operates the continuous playback start button BTcps during fast forward playback or rewind playback (during the moving image playback in step ST6 and during the still image playback in step ST9 in the flowchart in FIG. 9). In this case, the control unit 101 performs an interrupt process B shown in the flowchart in FIG. 11.

In step ST21, the control unit 101 starts the interrupt process B, and thereafter shifts to the process in step ST22. In step ST22, the control unit 101 determines whether or not the image file to be played back is a moving image file.

When the image file to be played back is a moving image file, the control unit 101 plays back the remaining moving image at normal speed. In this case, a high-definition output signal and a panel output signal corresponding to a moving image played back at normal speed are outputted from the video encoder 121.

On the other hand, when the image file to be played back is a still image file, the control unit 101 plays back the still image for 3 seconds in step ST24. In this case, a high-definition output signal and a panel output signal corresponding to a still image are outputted from the video encoder 121 for 3 seconds.

After the process in step ST23, or after the process in step ST24, in step ST25, the control unit 101 proceeds to step ST10 in the flowchart in FIG. 9.

Figure 11:
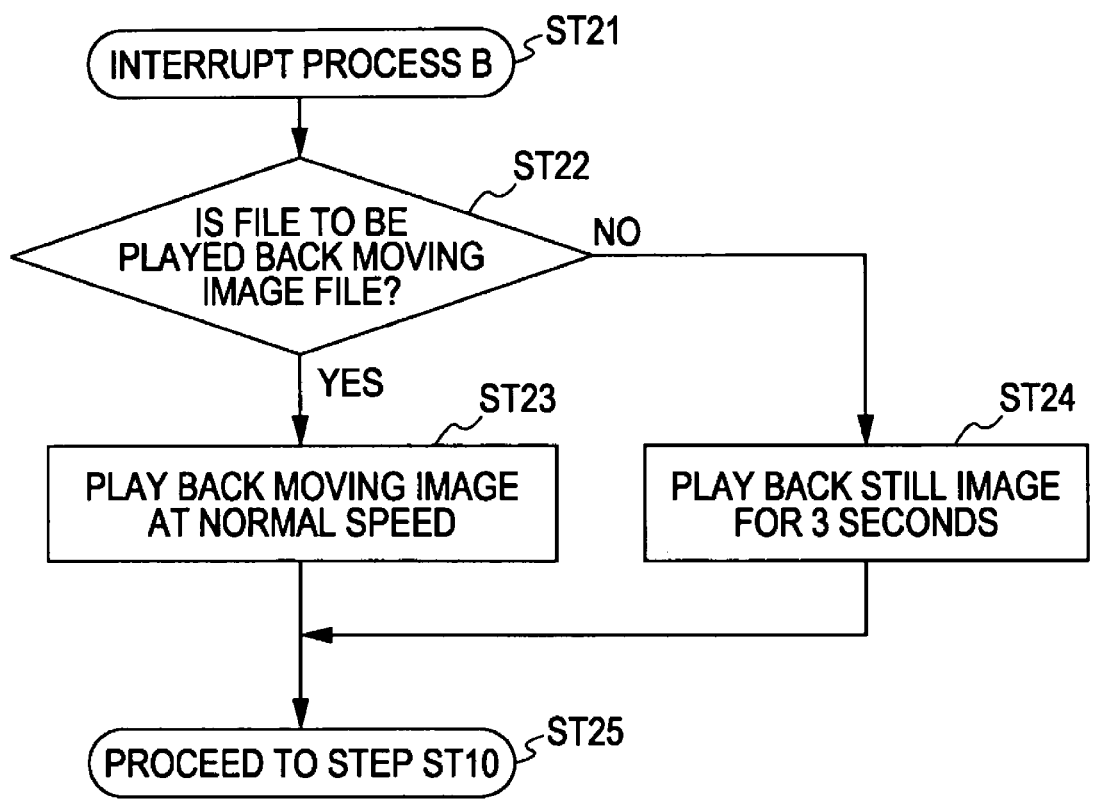
FIG. 11 is a flowchart showing an interrupt process B that is performed by a control unit when the user operates a continuous playback start button during fast forward playback or rewind playback.

By performing the interrupt process B illustrated in the flowchart in FIG. 11 when the user operates the continuous playback start button BTcps during fast forward playback or rewind playback, normal-speed playback is immediately performed from the current image file to be played back.

Incidentally, a description will be given of a control process of the control unit 101 in a case when the user operates the file advance button BTff or the file return button BTfr during normal-speed playback or during fast forward/rewind playback (during the moving image playback in steps ST5 and ST6 and during the still image playback in steps ST8 and ST9 in the flowchart in FIG. 9).

When the user operates the file advance button BTff, the control unit 101 immediately returns to step ST2, and shifts to a playback process of the next image file. This control process is the same as that in the case when the user operates the file advance button BTff when in the single playback mode.

Figure 12:
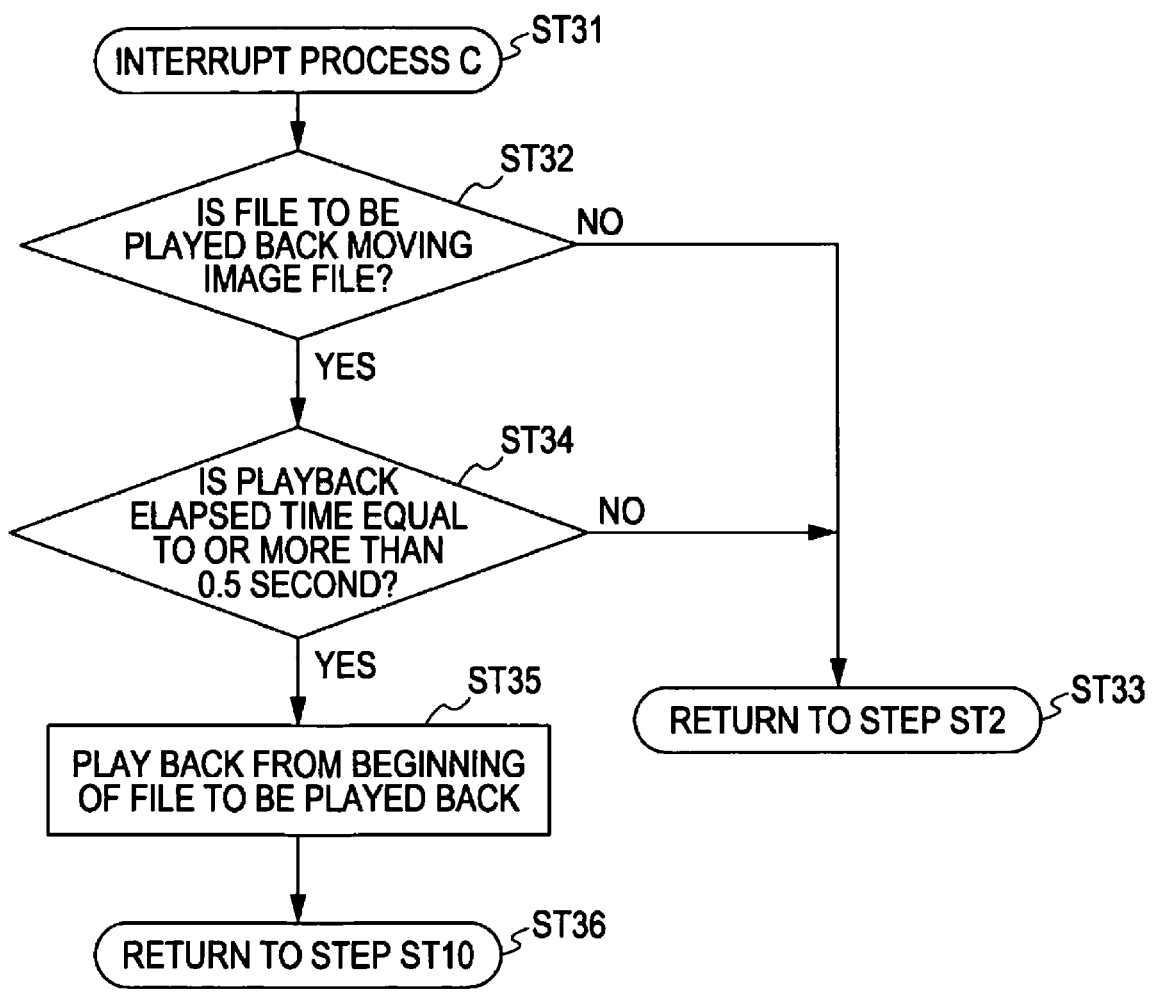
FIG. 12 is a flowchart showing an interrupt process C that is performed by a control unit when the user operates a file return button during normal-speed playback, when in a continuous playback mode.

On the other hand, when the user operates the file return button BTfr, the control unit 101 performs a control process different from that in the case when the user operates the file return button BTfr when in the single playback mode. That is, when the user operates the file return button BTfr in the single playback mode, the control unit 101 shifts to a playback process of the previous image file. However, when the user operates the file return button BTfr when in the continuous playback mode, the control unit 101 performs an interrupt process C illustrated in the flowchart in FIG. 12.

In step ST31, the control unit 101 starts the interrupt process C, and thereafter shifts to the process in step ST32. In step ST32, the control unit 101 determines whether or not the image file to be played back is a moving image file.

When the image file to be played back is a still image file, the control unit 101 immediately proceeds to step ST33, where the control unit 101 returns to step ST2 in the flowchart in FIG. 9, and shifts to a playback process of the previous image file. On the other hand, when the image file to be played back is a moving image file, the control unit 101 shifts to the process in step ST34.

In step ST34, the control unit 101 determines whether or not the playback elapsed time of the moving image is equal to or more than 0.5 second. When the playback elapsed time is less than 0.5 second, in step ST33, the control unit 101 immediately returns to step ST2 in the flowchart in FIG. 9, and shifts to a playback process of the previous image file.

In contrast, when the playback elapsed time is equal to or more than 0.5 second, in step ST35, the control unit 101 performs playback from the beginning of the current image file to be played back. Even when the user operates the file return button BTfr during this playback, the control unit 101 performs the interrupt process C illustrated in the flowchart in FIG. 12.

After the process in step ST36, in step ST36, the control unit 101 proceeds to step ST10 in the flowchart in FIG. 9.

Figure 13:
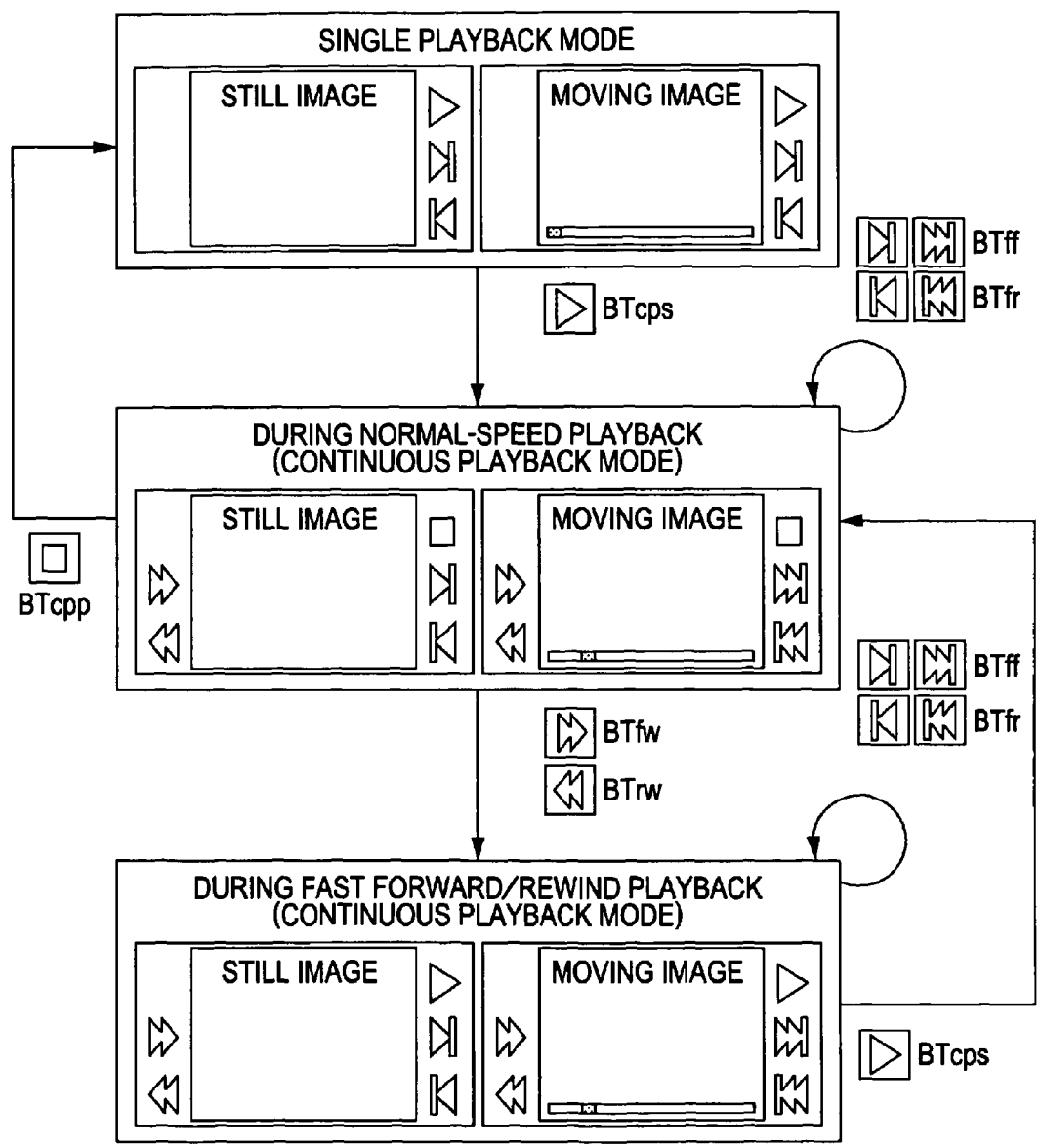
FIG. 13 is a schematic diagram showing state transitions when in a continuous playback mode of a digital still camera.

FIG. 13 is a schematic diagram showing state transitions when in the continuous playback mode of the digital still camera 100 shown in FIG. 1.

In the single playback mode, when the continuous playback button BTcps is operated, the state shifts to normal-speed playback in the continuous playback mode. During this normal-speed playback, file advance is performed when the file advance button BTff is operated, and file return is performed when the file return button BTfr is operated. Also, during this normal-speed playback, the state shifts to the single playback mode when the continuous playback stop button BTcpp is operated.

During normal-speed playback in the continuous playback mode, the state shifts to fast forward playback when the fast forward button BTfw is operated, and shifts to rewind playback when the rewind button BTrw is operated. Also, during fast forward playback or rewind playback, the state shifts to normal-speed playback when the continuous playback start button BTcps is operated. Also, during this fast forward/rewind playback, file advance is performed when the file advance button BTff is operated, and file return is performed when the file return button BTfr is operated.

Figure 14:
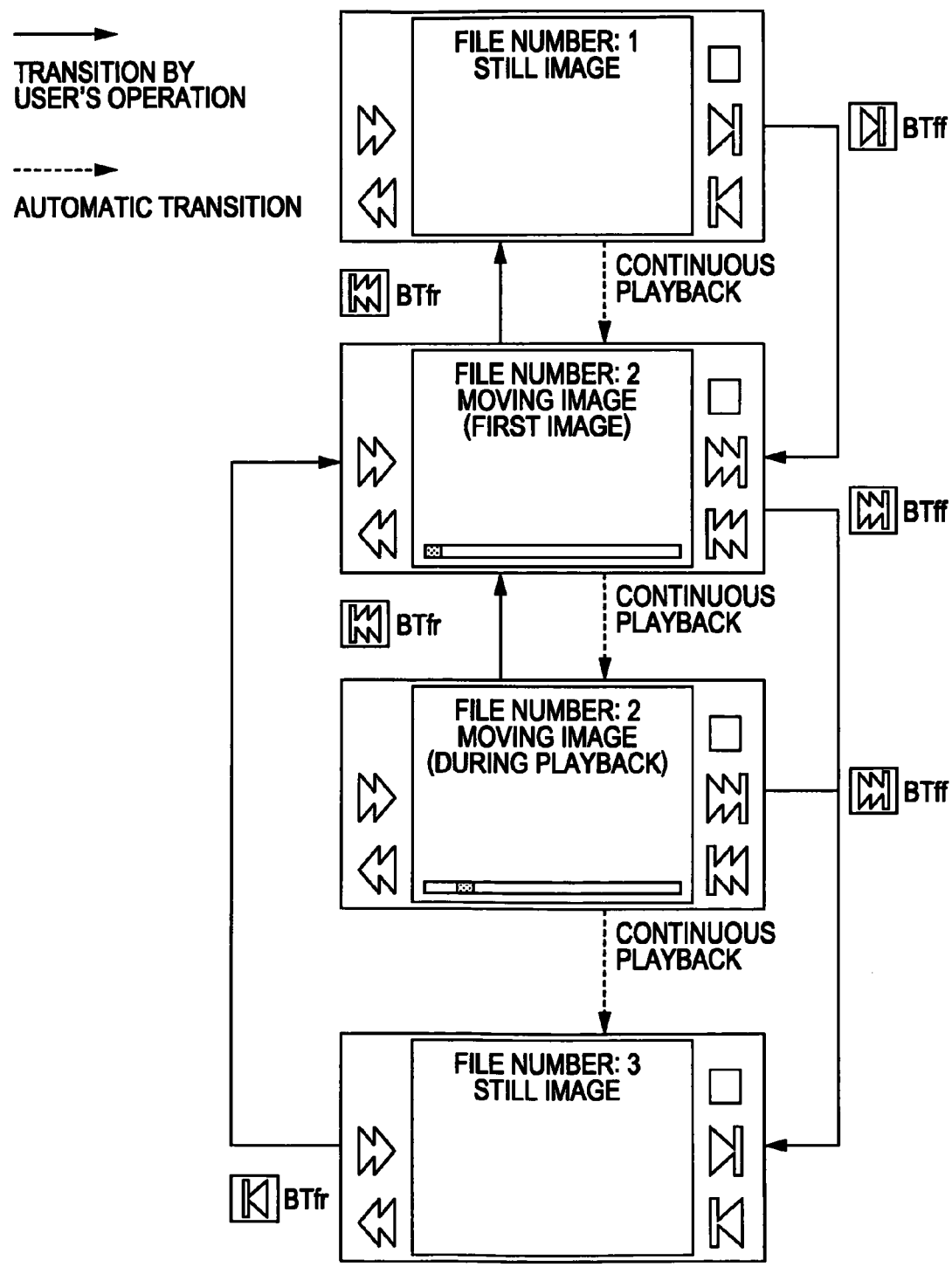
FIG. 14 is a schematic diagram showing state transitions during normal-speed playback when in a continuous playback mode of a digital still camera.

FIG. 14 is a schematic diagram showing state transitions during normal-speed playback when in the continuous playback mode of the digital still camera 100 shown in FIG. 1.

When there is no user's operation, the state transitions automatically to playback of the next image file, for example, from the still image of File Number 1 to the moving image of File number 2 and then to the still image of File Number 3. When the file advance button BTff is operated during playback of a still image or a moving image, the state shifts to playback of the next file.

When the file return button BTfr is operated during playback of a still image, the state shifts to playback of the previous image file. Also, when the file return button BTfr is operated during playback of a moving image, when the playback elapsed time is equal to or less than 0.5 second, the state returns to the first image of the moving image, and its playback state is continued.

On the other hand, when the file return button BTfr is operated during playback of a moving image, when the playback elapsed time is less than 0.5 second, the state shifts to playback of the previous image file. Thus, when the file return button BTfr is operated continuously during playback of a moving image, the state can be shifted to playback of the previous image file.

As described above, in the digital still camera 100 shown in FIG. 1, when in the continuous playback (display) mode, image files (image data) are continuously read from the memory card 116, and in the case of a moving image file (moving image data), a high-definition output signal and a panel output signal corresponding to moving image data are outputted, and in the case of a still image file (still image data), a high-definition output signal and a panel output signal corresponding to still image data are outputted for 3 seconds.

Therefore, when the continuous playback mode is entered, continuous playback (display) of image files (image data) recorded on the memory card 116 can be performed in a favorable manner, so the user can grasp a continuous recorded image at the time of preview. In this case, the user can check the condition of recording (condition of image capture) in a continuous series, without editing a plurality of image files (image data) into a single-image.

In the digital still camera 100 shown in FIG. 1, when in the single playback mode, a GUI screen including the continuous playback start button (start button for the continuous playback mode) BTcps is displayed on the display screen of the LCD panel 125, and when in the continuous playback mode, the continuous playback stop button (stop button for the continuous playback mode) BTcpp is displayed on the display screen of the LCD panel 125. Therefore, the operations of starting continuous playback (shifting from the single playback mode to the continuous playback mode) and stopping continuous playback (shifting from the continuous playback mode to the single playback mode) can be made easily on the display screen by using the touch panel 127.

In the digital still camera 100 shown in FIG. 1, whether or not it is possible to shift from the single playback mode to the continuous playback mode can be set in advance by using the setting menu (see FIG. 4). In the case of a setting in which it is possible to shift from the single playback mode to the continuous playback mode, when in the single playback mode, the continuous playback start button BTcps is displayed on the display screen of the LCD panel 125 (see FIGS. 5A and 5B).

However, in the case of a setting in which it is not possible to shift from the single playback mode to the continuous playback mode, the continuous playback start button BTcps is not displayed on the display screen of the LCD panel 125 when in the single playback mode (see FIGS. 3A and 3B). That is, in the digital still camera 100 shown in FIG. 1, if the continuous playback start button BTcps is unnecessary, its display can be deleted from the display screen, and operating buttons included in the GUI screen can be rearranged to include only those which are actually used by the user.

In the digital still camera 100, a setting menu is displayed on the display panel 125 when setting whether or not it is possible to shift from the single playback mode to the continuous playback mode. Therefore, whether or not it is possible to shift from the single playback mode to the continuous playback mode can be easily set by the user on the display screen by using the touch panel 127.

In the digital still camera 100 shown in FIG. 1, when in the continuous playback mode, the progress bar Bra indicating the playback time and playback elapsed time of a moving image is displayed on the display screen of the LCD panel 125 during playback of the moving image. However, no such display is made on the display screen of the LCD panel 125 during playback of a still image. Therefore, the user can easily learn whether a moving image is being played back or a still image is being played back. Also, the user can easily and visually grasp the playback time and playback elapsed time of a moving image.

In the digital still camera 100 shown in FIG. 1, when in the continuous playback mode, the user can perform fast forward playback and rewind playback over a plurality of continuous image files recorded on the memory card 116, by operating the fast forward button BTfw and the rewind button BTrw. Therefore, the user can effectively retrieve or check an image file.

In the digital still camera 100 shown in FIG. 1, during normal-speed playback when in the continuous playback mode, the fast forward button BTfw and the rewind button BTrw are displayed on the display screen of the LCD panel 125, and during fast forward playback or rewind playback when in the continuous playback mode, the continuous playback start button BTcps is displayed on the display screen of the LCD panel 125. Therefore, the user can easily perform operations of starting and stopping fast forward or rewind on the display panel by using the touch panel 127.

Also, in the digital still camera 100 shown in FIG. 1, when in the continuous playback mode, the user can perform a file advance operation of playing back the next image file and a file return operation of playing back the previous image file. Therefore, when in the continuous playback mode, the user can perform a file advance operation to advance the playback file to the next image file, or can perform a file rewind operation to return the playback file to the previous image file, thereby making it possible to effectively retrieve and check an image file.

In the digital still camera 100 shown in FIG. 1, when in the continuous playback mode and during normal-speed playback, the file advance button Btff and the file return button BTfr are displayed on the display screen of the LCD panel 125. Therefore, the user can easily perform file advance and file return operations on the display screen by using the touch panel 127.

The above-described embodiment is directed to the case in which the playback speed for fast forward playback or rewind playback is 6 times faster than that during normal-speed playback. However, this playback speed for fast forward playback and rewind playback may be set by the user.

Figure 15:
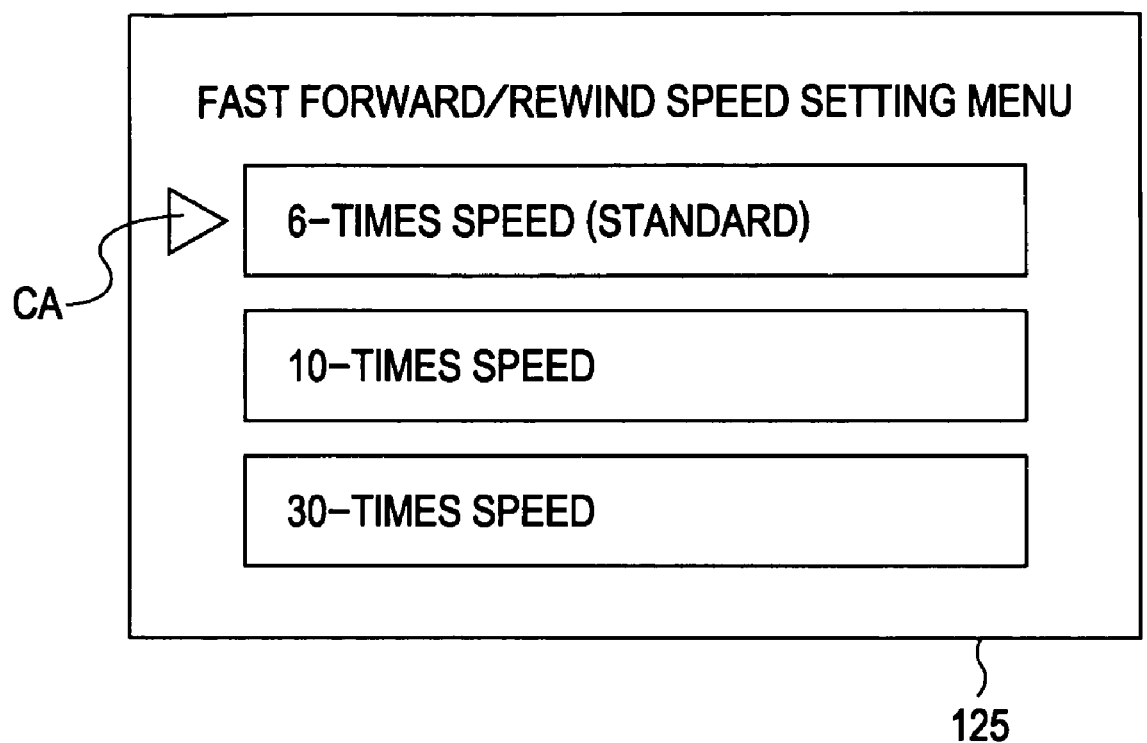
FIG. 15 is a view showing an example of a setting menu that is displayed on an LCD panel and used for setting fast forward/rewind speed.

FIG. 15 shows an example of a setting menu displayed on the LCD panel 125 of the digital still camera 100. The user can set the playback speed for fast forward playback and rewind playback by pressing portions of the touch panel 127 where "6-times speed (standard)", "10-times speed", and "30-times speed" are displayed. In the example of display shown in FIG. 16, the cursor CA is at a position corresponding to the display position of "6-times speed (standard)", and hence it can be seen that the playback speed is set to "6-times speed (standard)".

Figure 16:
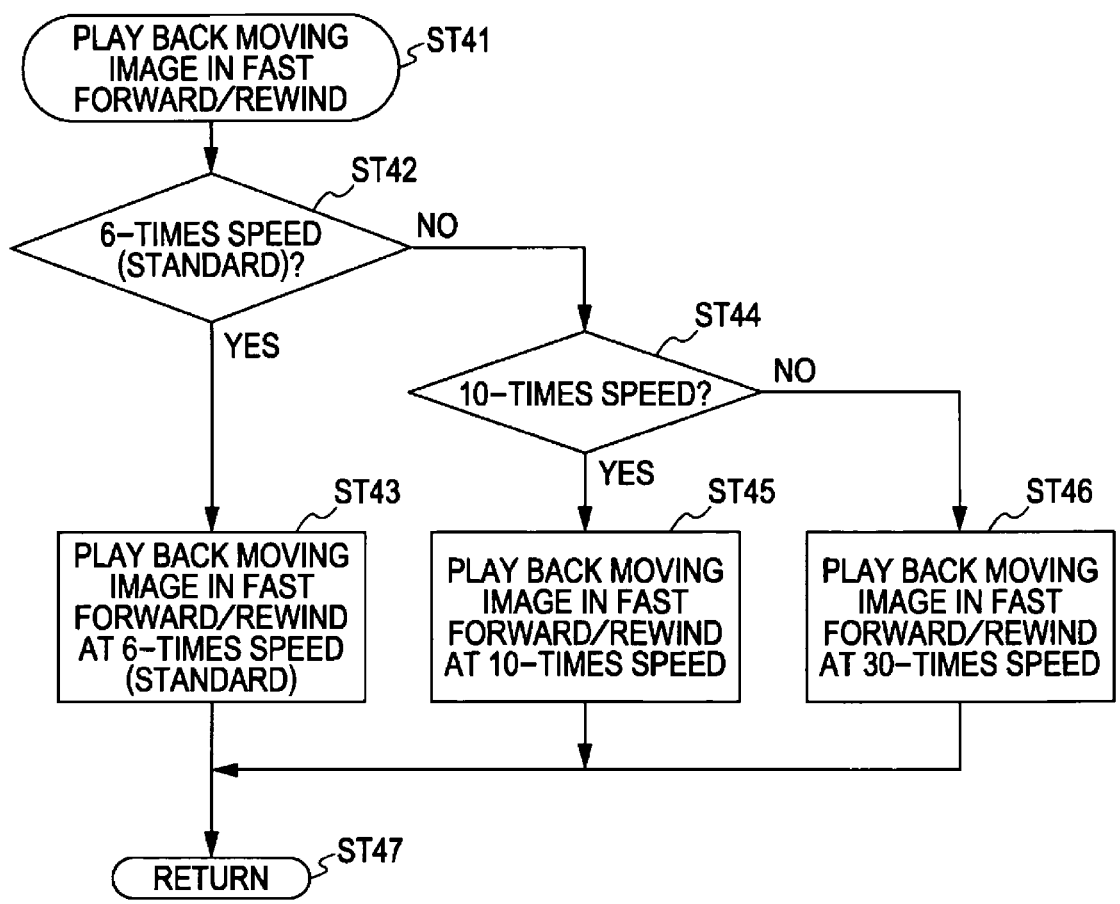
FIG. 16 is a flowchart showing a fast forward/rewind playback process of a moving image which is performed by a control unit, in the case of a setting in which it is possible for the user to set fast forward/rewind speed.

In a case where the user can set the playback speed for fast forward playback and rewind playback as described above, the control unit 101 performs a sub-routine process illustrated in the flowchart in FIG. 16, instead of the process in step ST6 in the flowchart in FIG. 9.

That is, in step ST41, the control unit 101 performs a process of playing back a moving image in fast forward/rewind, and thereafter shifts to the process in step ST42. In step ST42, the control unit 101 determines whether or not the playback speed is set to "6-times speed (standard)".

When the playback speed is set to "6-times speed (standard)", in step ST43, the control unit 101 performs fast forward playback or rewind playback of the moving image by setting the playback speed to 6-times speed. In this case, a high-definition output signal and a panel output signal corresponding to a moving image (played back in fast forward or rewind at 6-times speed) are outputted from the video encoder 121.

When the playback speed is not set to "6-times speed (standard)" in step ST42, the control unit 101 shifts to the process in step ST44. In step ST44, the control unit 101 determines whether or not the playback speed is set to "10-times speed".

When the playback speed is set to "10-times speed (standard)", in step ST45, the control unit 101 performs fast forward playback or rewind playback of the moving image by setting the playback speed to 10-times speed. In this case, a high-definition output signal and a panel output signal corresponding to a moving image (played back in fast forward or rewind at 10-times speed) are outputted from the video encoder 121.

When the playback speed is not set to "10-times speed (standard)" in step ST44, the control unit 101 shifts to the process in step ST46. In step ST46, the control unit 101 performs fast forward playback or rewind playback of the moving image by setting the playback speed to 30-times speed. In this case, a high-definition output signal and a panel output signal corresponding to a moving image (played back in fast forward or rewind at 30-times speed) are outputted from the video encoder 121.

After the process in step ST43, step ST45, or step ST46, the control unit 101 returns in step ST47.

When the control unit 101 performs the sub-routine illustrated in the flowchart in FIG. 16, at the fast forward playback or rewind playback of a moving image file, fast forward playback or rewind playback is performed at a playback speed that is set by the user.

Figure 17:
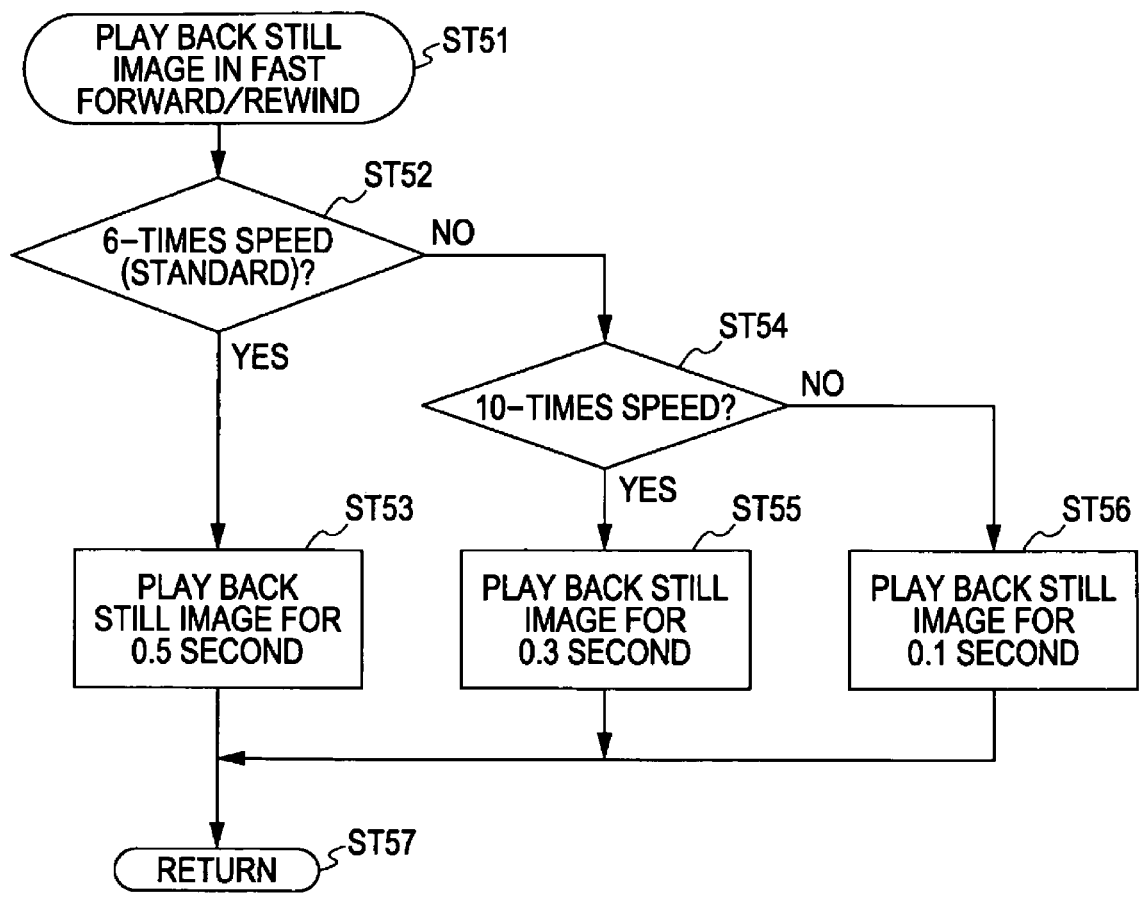
FIG. 17 is a flowchart showing a fast forward/rewind playback process of a still image which is performed by a control unit, in the case of a setting in which it is possible for the user to set fast forward/rewind speed.

In a case where the user can set the playback speed for fast forward playback and rewind playback as described above, the control unit 101 performs a sub-routine process illustrated in the flowchart in FIG. 17, instead of the process in step ST9 in the flowchart in FIG. 9.

That is, in step ST51, the control unit 101 performs a process of playing back a still image in fast forward/rewind, and thereafter shifts to the process in step ST52. In step ST52, the control unit 101 determines whether or not the playback speed is set to "6-times speed (standard)".

When the playback speed is set to "6-times speed (standard)", in step ST53, the control unit 101 plays back the still image for 0.5 second. In this case, a high-definition output signal and a panel output signal corresponding to a still image are outputted from the video encoder 121 for 0.5 second.

When the playback speed is not set to "6-times speed (standard)" in step ST52, the control unit 101 shifts to the process in step ST54. In step ST54, the control unit 101 determines whether or not the playback speed is set to "10-times speed".

When the playback speed is set to "10-times speed", in step ST55, the control unit 101 plays back the still image for 0.3 second. In this case, a high-definition output signal and a panel output signal corresponding to a still image are outputted from the video encoder 121 for 0.3 second.

When the playback speed is not set to "10-times speed (standard)" in step ST54, the control unit 101 shifts to the process in step ST56. In step ST56, the control unit 101 plays back the still image for 0.1 second. In this case, a high-definition output signal and a panel output signal corresponding to a still image are outputted from the video encoder 121 for 0.1 second.

After the process in step ST53, step ST55, or step ST56, the control unit 101 returns in step ST57.

When the control unit 101 performs the sub-routine illustrated in the flowchart in FIG. 17, at the fast forward playback or rewind playback of a still image file, a high-definition output signal and a panel output signal corresponding to a still image are outputted for a time corresponding to the playback speed set by the user.

While in the above-described example the user can set the playback speed for fast forward playback or rewind playback to either one of "6-times speed", "10-times speed", and "30-times speed", the playback speed and the number of its kinds are not limited to these. Also, the above description is directed to the case in which the playback speed for fast forward playback and rewind playback is set in advance by using the fast forward/rewind speed setting menu (see FIG. 15) displayed on the LCD panel 125.

However, it is also conceivable to change the playback speed during fast forward playback or rewind playback. In that case, for example, during fast forward playback or rewind playback, the playback speed may be made to change in a toggle fashion every time the fast forward button BTfw or the rewind button BTrw is pressed, such as in the order of "6-times speed (standard)", "10-times speed", "30-times speed", "6-times speed (standard)", "10-times speed", and so on.

The above-described embodiment is directed to the case in which a press operation is made on a position of the touch panel 127 corresponding to the file advance button BTff, the file return button BTfr, the fast forward button BTfw, or the rewind button BTrw displayed on the LCD 125. However, a configuration is also conceivable in which the kind or speed of file advance/file return or fast forward/rewind is changed depending on the tracing direction, speed, distance, or the like on the touch panel 127 by a user's finger or the like. Also, it is also conceivable to perform fast forward/rewind with an external key of the user operation unit 102 or the like, in which case the speed may be changed in accordance with the time for which the key is pressed.

In the above-described embodiment, ay the playback of a moving image, the progress bar Bra indicating the playback time and playback elapsed time of a moving image is displayed on the LCD panel 125 so as to be superimposed on the moving image. When in the continuous playback mode, a GUI screen including the playback time (display time) and playback elapsed time of the all of image files (all of image data) to be continuously played back which are recorded on the memory card 116 may be displayed on the LCD panel 125.

Figure 18A:
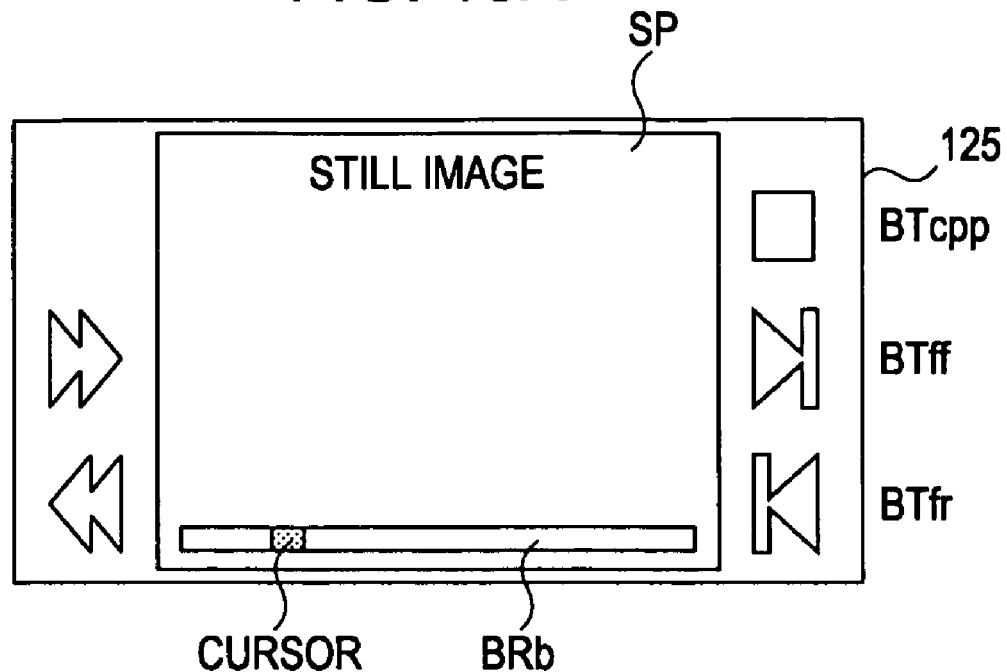
FIGS. 18A and 18B shows examples of display on an LCD panel when in a continuous playback mode and during normal-speed playback of a still image and a moving image, respectively.
Figure 18B:
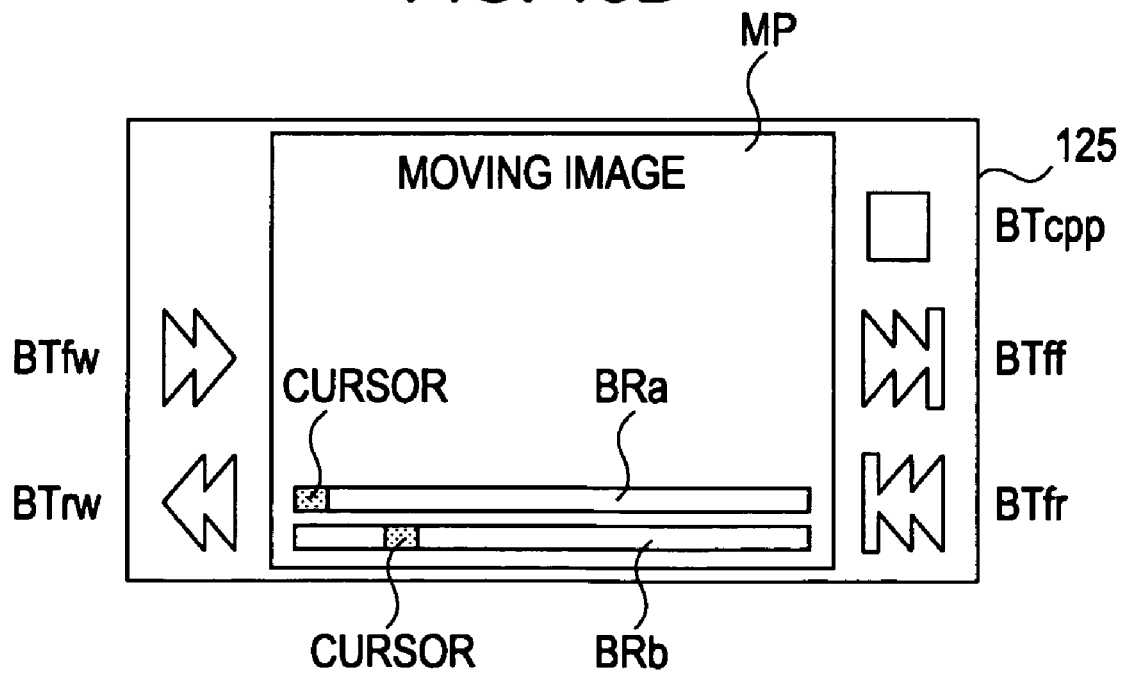

FIG. 18A shows an example of display on the LCD panel 125 when in the continuous playback mode and during normal-speed playback of a still image. Also, FIG. 18B shows an example of display on the LCD panel 125 when in the continuous playback mode and during normal-speed playback of a moving image. In FIGS. 18A and 18B, portions corresponding to those in FIGS. 6A and 6B are denoted by the same reference numerals, and detailed description thereof is omitted.

Figure 19A:
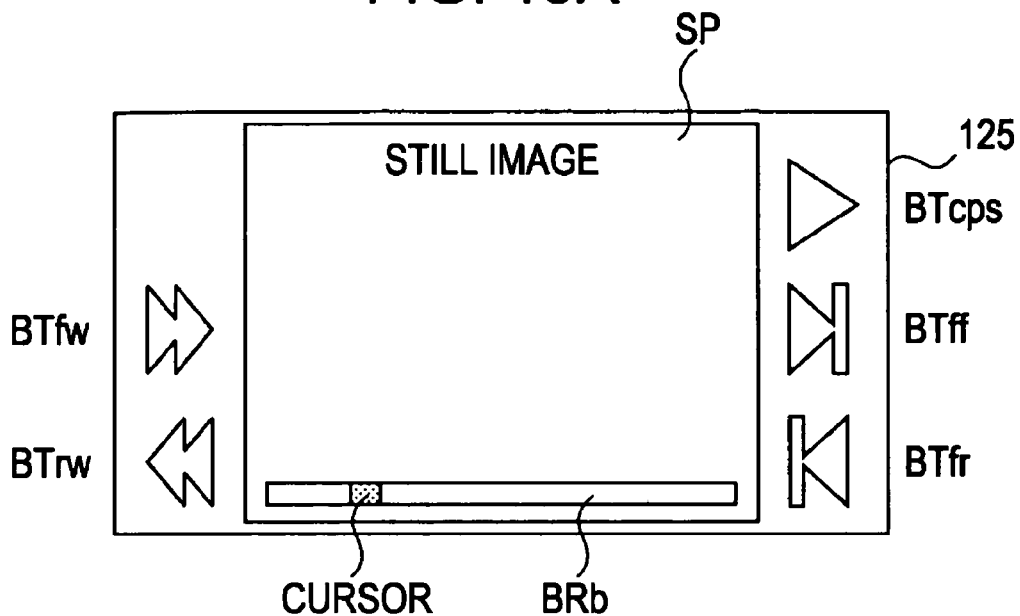
FIGS. 19A and 19B shows examples of display on an LCD panel when in a continuous playback mode and during fast forward playback or rewind playback of a still image and a moving image, respectively.
Figure 19B:
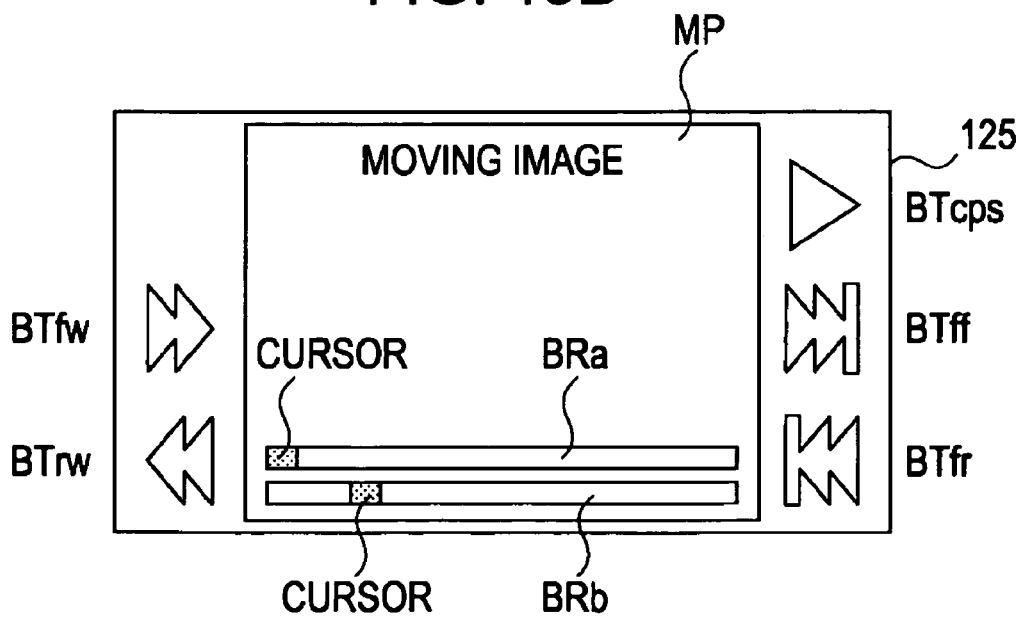

FIG. 19A shows an example of display on the LCD panel 125 when in the continuous playback mode and during fast forward playback or rewind playback of a still image. Also, FIG. 19B shows an example of display on the LCD panel 125 when in the continuous playback mode and during fast forward playback or rewind playback of a moving image. In FIGS. 19A and 19B, portions corresponding to those in FIGS. 7A and 7B are denoted by the same reference numerals, and detailed description thereof is omitted.

As shown in FIGS. 18A and 18B and FIGS. 19A and 19B, a progress bar BRb, which indicates the playback time and playback elapsed time of all of the image files to be continuously played back which are recorded on the memory card 116, is displayed on the LCD panel 125. The cursor on the progress bar BRb moves with changes in playback elapsed time. The main part of the progress bar BRb indicates the playback time of all of the image files to be continuously played back, and the cursor position indicates the playback elapsed time. As shown in FIGS. 18B and 19B, at the playback of a moving image, the progress bar BRb is displayed in parallel to the progress bar BRa indicating the playback time and playback elapsed time of a moving image.

The playback time and playback elapsed time of a moving image, and the playback time and playback elapsed time of all of the image files to be continuously played back may be represented by a display of numerical values, instead of being represented by a display of the progress bars BRa and BRb as described above.

In the case where the playback time and playback elapsed time of all of the image files to be continuously played back are indicated by the progress bar BRb as described above, a configuration is also possible in which when the user presses a position on the touch panel 127 corresponding to a predetermined position of the progress bar BRb, a jump can be made to a playback position corresponding to the predetermined position.

As for this jump operation, the same applies to the progress bar BRa that displays the playback time and playback elapsed time of a moving image. That is, a configuration is possible in which when the user presses a position on the touch panel 127 corresponding to a predetermined position of the progress bar BRa, a jump can be made to a playback position corresponding to the predetermined position.

In the case where the playback time and playback elapsed time of all of the image files to be continuously played back are indicated by the progress bar BRb as described above, a moving image file and a still image file may be differentiated from each other for display. In that case, the user can, for example, select only a moving image file and perform the above-described jump operation.

While the above-described embodiment is directed to the case in which image data (moving image data or still image data) read from a recording medium is compression-encoded data, the data to be read may be uncompressed data. In that case, the compression/decompression unit 114 is unnecessary in the digital still camera 100 shown in FIG. 1.

The above-described embodiment is directed to the case in which all the image files recorded on the memory card 116 are image files to be continuously played back (see FIG. 2). However, the user may be able to arbitrarily select image files to be continuously played back, from among image files recorded on the memory card 116. Thus, the user can set only those image files which are associated with each other in accordance with such attributes as the same date, event, and person (face, smiling face, adult, child, male, and female), as image files to be continuously played back.

While in the above-described embodiment fast forward playback and rewind playback are given as examples of variable-speed playback (variable-speed display), as other types of variable-speed playback, slow playback in which the playback speed becomes lower than that during normal-speed playback, frame advance playback, and the like are also conceivable. In the case of such slow playback or frame advance playback, it is conceivable to make the output time of still image data longer than that in the case of normal-speed playback.

It is conceivable to configure the digital still camera 100 shown in FIG. 1 as HDMI-CEC-compliant equipment, and connect the digital still camera 100 to a television receiver as HDMI-CEC-compliant equipment via an HDMI cable. In that case, while displaying the playback image of the digital still camera 100 on the display panel of the television receiver, the various operations of the digital still camera 100 described above can be manipulated with, for example, the remote control of the television receiver.

While the above-described embodiment is directed to the case in which the present invention is applied to the digital still camera 100, the present invention can be also applied to the case of displaying image data recorded on various kinds of recording medium. In this case, the recording medium is not limited to a semiconductor memory such as a memory card but may be a disc-shaped recording medium such as an optical disc, or an HDD (Hard Disk Drive).

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus which controls display of a plurality of pieces of image data containing both moving image data and still image data, comprising:
a moving image/still image determining unit that determines whether or not image data to be displayed is the moving image data or the still image data, when in a continuous display mode that displays the plurality of pieces of image data continuously in a predetermined sequence;
a display control unit that starts display control of the next image in response to finishing of display of all of the moving image data when the image data to be displayed is the moving image data, and starts display control of the next image data in response to finishing of display of the still image data for a predetermined time when the image data to be displayed is the still image data; and
when, in the continuous display mode, data return is instructed in a state in which display control of the moving image data is performed by the display control unit,
the display control unit returns to the beginning of the moving image data and starts display control, when a determination of display elapsed time is a display elapsed time of the moving image data is equal to or more than a predetermined time, and
the display control unit returns to image data preceding the moving image data and starts display control, when the determination of display elapsed time is the display elapsed time of the moving image data is less than the predetermined time.

2. The image processing apparatus according to claim 1, further comprising:
a graphic display unit that displays a graphical user interface screen on the display panel so as to be superimposed on an image based on the image data to be displayed; and
a user setting unit that allows a user to set whether or not to display a start button and a stop button for the continuous display mode on the display panel so as to be superimposed on the image.

3. The image processing apparatus according to claim 1, wherein:
when in the continuous display mode and in a variable-speed display mode, the display control unit changes a display time of the moving image data and a display time of the still image data relative to a display time in a normal-speed display mode.

4. The image processing apparatus according to claim 1, further comprising:
a display panel that displays an image based on the image data to be displayed; and
a graphic display unit that displays a graphical user interface screen on the display panel so as to be superimposed on the image,
wherein when, in the continuous display mode, an image based on the moving image data is displayed on the display panel, the graphic display unit displays on the display panel a graphical user interface screen including a display time and a display elapsed time of the moving image data.

5. The image processing apparatus according to claim 1, wherein:
the display control unit starts display control of the next image data when data advance is instructed.

6. The image processing apparatus according to claim 1, further comprising:
a display panel that displays an image based on the image data to be displayed; and
a graphic display unit that displays a graphical user interface screen on the display panel so as to be superimposed on the image,
wherein when in the continuous display mode, the graphic display unit displays, on the display panel, the graphical user interface screen including display of a display time and a display elapsed time of all of image data to be continuously displayed.

7. An image processing method for controlling display of a plurality of pieces of image data containing both moving image data and still image data, comprising the steps of:
determining whether or not image data to be displayed is the moving image data or the still image data, when in a continuous display mode that displays the plurality of pieces of image data continuously in a predetermined sequence;

starting display control of the next image in response to finishing of display of all of the moving image data, when the image data to be displayed is the moving image data;

starting display control of the next image data in response to finishing of display of the still image data for a predetermined time, when the image data to be displayed is the still image data; and when, in the continuous display mode, data return is instructed in a state in which display control of the moving image data is performed, returning to the beginning of the moving image data and starting display control, when a determination of display elapsed time is a display elapsed time of the moving image data is equal to or more than a predetermined time, and returning to image data preceding the moving image data and starting display control, when the determination of display elapsed time is the display elapsed time of the moving image data is less than the predetermined time.

8. A non-transitory storage medium recorded with a program for causing a computer to execute an image processing method for controlling display of a plurality of pieces of image data containing both moving image data and still image data, the image processing method comprising the steps of:

determining whether or not image data to be displayed is the moving image data or the still image data, when in a continuous display mode that displays the plurality of pieces of image data continuously in a predetermined sequence;

starting display control of the next image in response to finishing of display of all of the moving image data, when the image data to be displayed is the moving image data;

starting display control of the next image data in response to finishing of display of the still image data for a predetermined time, when the image data to be displayed is the still image data; and when, in the continuous display mode, data return is instructed in a state in which display control of the moving image data is performed, returning to the beginning of the moving image data and starting display control, when a determination of display elapsed time is a display elapsed time of the moving image data is equal to or more than a predetermined time, and returning to image data preceding the moving image data and starting display control, when the determination of display elapsed time is the display elapsed time of the moving image data is less than the predetermined time.

9. An image playback apparatus comprising:

an image data reading unit that reads image data recorded on a recording medium; and an image data output unit that outputs playback image data on the basis of the image data read by the image data reading unit, wherein when in a continuous playback mode, the image data reading unit continuously reads image data to be continuously played back which is recorded on the recording medium, when in the continuous playback mode, when the image data read by the image data recording unit is moving image data, the image data output unit outputs the moving image data as the playback image data, and when the image data read by the image data recording unit is still image data, the image data output unit outputs the still image data for a predetermined time as the playback image data, and when, in the continuous playback mode, data return is instructed in a state in which the moving image data is outputted from the image data output unit as the playback image data, the image data output unit returns to the beginning of the moving image data and starts an output of the playback image data, when a determination of playback elapsed time is a playback elapsed time of the moving image data is equal to or more than a predetermined time, and the image data output unit returns to image data preceding the moving image data and starts an output of the playback image data, when the determination of playback elapsed time is the playback elapsed time of the moving image data is less than the predetermined time.

10. The image playback apparatus according to claim 9, wherein:

when in the continuous playback mode and in a variable-speed playback mode, the image data output unit changes an output time of the playback image data corresponding to the image data sequentially read by the image data reading unit, relative to an output time in a normal-speed playback mode.

11. The image playback apparatus according to claim 10, wherein:

when, in the continuous playback mode and in the variable-speed playback mode, the output time of the playback image data corresponding to the image data read by the image data reading unit is to be changed relative to the output time in the normal-speed playback mode, when the image data read by the image data reading unit is moving image data, the image data output unit changes playback speed of the moving image data, and when the image data read by the image data reading unit is still image data, the image data output unit changes an output time of the still image data outputted as the playback image data.

12. The image playback apparatus according to claim 9, further comprising:

a graphic display unit that displays, on a display panel that displays a playback image, a graphical user interface screen so as to be superimposed on the playback image, on the basis of the playback image data outputted from the image data output unit, wherein when, in the continuous playback mode, the image data output unit is outputting the moving image data as the playback image data, the graphic display unit displays, on the display panel, the graphical user interface screen including display of a playback time and a playback elapsed time of the moving image data.

13. The image playback apparatus according to claim 9, wherein:

when in the continuous playback mode, when data advance is instructed, the image data output unit enters a state in which the image data output unit outputs the playback image data corresponding to the next image data.

14. The image playback apparatus according to claim 9, further comprising:

a graphic display unit that displays, on a display panel that displays a playback image, a graphical user interface screen so as to be superimposed on the playback image, on the basis of the playback image data outputted from the image data output unit, wherein when in the continuous playback mode, the graphic display unit displays, on the display panel, the graphical user interface screen including display of a playback time and a playback elapsed time of all of image data to be continuously played back which is recorded on the recording medium.

15. An image playback method comprising the steps of:

continuously reading image data to be continuously played back which is recorded on a recording medium;

outputting moving image data as playback image data, when the read image data is the moving image data;

outputting still image data as the playback image data for a predetermined time, when the read image data is the still image data; and when, in a continuous playback mode, data return is instructed in a state in which the moving image data is outputted as the playback image data, returning to the beginning of the moving image data and starting an output of the playback image data, when a determination of playback elapsed time is a playback elapsed time of the moving image data is equal to or more than a predetermined time, and returning to image data preceding the moving image data and starting an output of the playback image data, when the determination of playback elapsed time is the playback elapsed time of the moving image data is less than the predetermined time.

16. A non-transitory storage medium recorded with a program for causing a computer to execute an image playback method, the image playback method comprising the steps of:

continuously reading image data to be continuously played back which is recorded on a recording medium;

outputting moving image data as playback image data, when the read image data is the moving image data;

outputting still image data as the playback image data for a predetermined time, when the read image data is the still image data; and when, in a continuous playback mode, data return is instructed in a state in which the moving image data is outputted as the playback image data, returning to the beginning of the moving image data and starting an output of the playback image data, when a determination of playback elapsed time is a playback elapsed time of the moving image data is equal to or more than a predetermined time, and returning to image data preceding the moving image data and starting an output of the playback image data, when the determination of playback elapsed time is the playback elapsed time of the moving image data is less than the predetermined time.

* * * * *